US012801073B2

(12) United States Patent
Okamoto et al.

(10) Patent No.: US 12,801,073 B2
(45) Date of Patent: Nov. 17, 2026

(54) SHEET FEEDING DEVICE AND IMAGE FORMING APPARATUS

(71) Applicant: KYOCERA Document Solutions Inc., Osaka (JP)

(72) Inventors: Sueaki Okamoto, Osaka (JP); Yuta Kitabayashi, Osaka (JP); Yuji Kamiyama, Osaka (JP); Yuji Toyota, Osaka (JP); Takeshi Arakawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/422,138

(22) Filed: Dec. 16, 2025

(65) Prior Publication Data

US 2026/0169415 A1 Jun. 18, 2026

(30) Foreign Application Priority Data

Dec. 18, 2024 (JP) ................................ 2024-221479

(51) Int. Cl.
*G03G 15/00* (2006.01)
*B65H 3/06* (2006.01)
(Continued)

(52) U.S. Cl.
CPC ....... *G03G 15/6511* (2013.01); *B65H 3/0607* (2013.01); *B65H 3/0669* (2013.01);
(Continued)

(58) Field of Classification Search
CPC ........... G03G 15/6511; G03G 15/6558; G03G 15/6561; G03G 15/6564; G03G 2215/00383; G03G 2215/00396; G03G 2215/004; G03G 2215/00405; G03G 2215/00548; G03G 2215/00556; G03G 2215/00561; G03G 2215/00599; B65H 3/0607; B65H 3/565; B65H 7/06;
(Continued)

(56) References Cited

U.S. PATENT DOCUMENTS

2015/0298932 A1* 10/2015 Mizuno ................ B65H 3/0669
271/3.19
2017/0217708 A1* 8/2017 Satake ............... G03G 15/6511
(Continued)

FOREIGN PATENT DOCUMENTS

JP 2020132413 A 8/2020

*Primary Examiner* — Carla J Therrien
(74) *Attorney, Agent, or Firm* — Alleman Hall LLP

(57) ABSTRACT

A displacement mechanism can be switched between a contact state in which the stack of sheets and the feeding rotating body are brought into contact with each other and a separation state in which the stack of sheets and the feeding rotating body are separated by displacing the stack of sheets or the feeding rotating body. A return mechanism executes a sheet return process for returning a positionally deviated sheet to an upstream side in a sheet feeding direction when the displacement mechanism switches from the contact state to the separation state. A processing device derives a positional deviation amount of a target sheet. A control device causes the return mechanism to execute the sheet return process when the positional deviation amount satisfies a positional deviation condition.

12 Claims, 12 Drawing Sheets

(51) Int. Cl.
*B65H 3/56* (2006.01)
*B65H 7/06* (2006.01)

(52) U.S. Cl.
CPC ............... *B65H 3/565* (2013.01); *B65H 7/06* (2013.01); *G03G 15/6564* (2013.01); *G03G 2215/00383* (2013.01); *G03G 2215/00396* (2013.01); *G03G 2215/004* (2013.01); *G03G 2215/00405* (2013.01); *G03G 2215/00599* (2013.01); *G03G 2215/00725* (2013.01); *G03G 2215/00729* (2013.01)

(58) Field of Classification Search
CPC ...... B65H 7/08; B65H 7/12; B65H 2511/414; B65H 2511/51; B65H 2513/50; B65H 2513/51; B65H 2513/512; B65H 2801/06
See application file for complete search history.

(56) References Cited

U.S. PATENT DOCUMENTS

2019/0193964 A1* 6/2019 Murakami ............... B65H 1/24
2024/0002181 A1* 1/2024 Kitano ................. B65H 3/5261

* cited by examiner

SHEET FEEDING DEVICE AND IMAGE FORMING APPARATUS

INCORPORATION BY REFERENCE

This application is based upon and claims the benefit of priority from the corresponding Japanese Patent Application No. 2024-221479 filed on Dec. 18, 2024, the entire contents of which are incorporated herein by reference.

BACKGROUND

The present disclosure relates to a sheet feeding device and an image forming apparatus that determine a sheet feeding state based on a time required to feed a sheet.

The image forming apparatus includes a sheet conveying device and a printing device that forms an image on a conveyed sheet. The sheet conveying device includes a sheet feeding device that feeds a topmost sheet of a stack of sheets to a conveying path, and a plurality of sets of conveying roller pairs that convey the sheet along the conveying path.

The sheet feeding device includes a sheet detecting device that detects the sheet fed to the conveying path. It is known that the image forming apparatus measures feeding speed of the sheet based on the detection result by the sheet detecting device.

SUMMARY

A sheet feeding device according to an aspect of the present disclosure includes a feeding mechanism, a displacement mechanism, a sheet detecting device, a timing device, a return mechanism, a processing device, and a control device. The feeding mechanism has a feeding rotating body that contacts an upper surface of a topmost sheet of a stack of sheets, and executes a feeding process of feeding each sheet from the stack of sheets to a conveying path by rotating the feeding rotating body. A displacement mechanism is a mechanism that can be switched between a contact state in which the stack of sheets and the feeding rotating body are brought into contact with each other and a separation state in which the stack of sheets and the feeding rotating body are separated by displacing the stack of sheets or the feeding rotating body. The sheet detecting device detects each sheet at a position on a downstream side of the feeding rotating body in a sheet feeding direction. The timing device measures an elapsed time from a time when the feeding process for each sheet is started to a time when each sheet is detected by the sheet detecting device. The return mechanism, when the displacement mechanism switches from the contact state to the separation state, executes a sheet return process for returning a positionally deviated sheet of the stack of sheets that has been positionally deviated to a downstream side in the sheet feeding direction to an upstream side in the sheet feeding direction. The processing device derives a positional deviation amount representing a deviation amount of a position of a target sheet relative to the initial reference position at a time when the feeding process for the target sheet is started, based on a preset reference feeding time and a target measurement time measured by the timing device for the target sheet fed by the feeding process. The control device causes the return mechanism to execute the sheet return process when the positional deviation amount satisfies a predetermined positional deviation condition.

An image forming apparatus according to another aspect of the present disclosure includes the sheet feeding device and a printing device that forms an image on each sheet fed by the sheet feeding device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
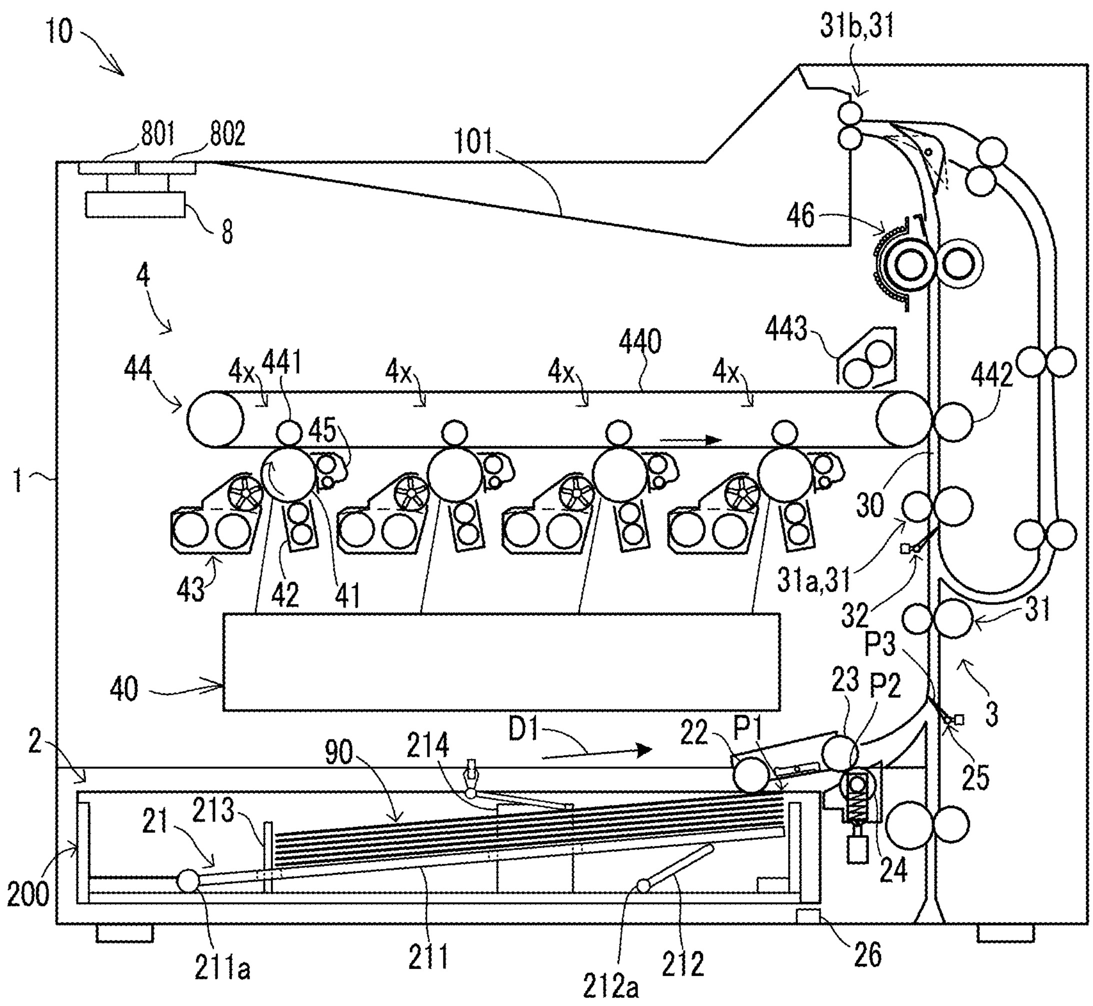
FIG. 1 is a diagram showing a configuration of an image forming apparatus according to an embodiment.
Figure 2:
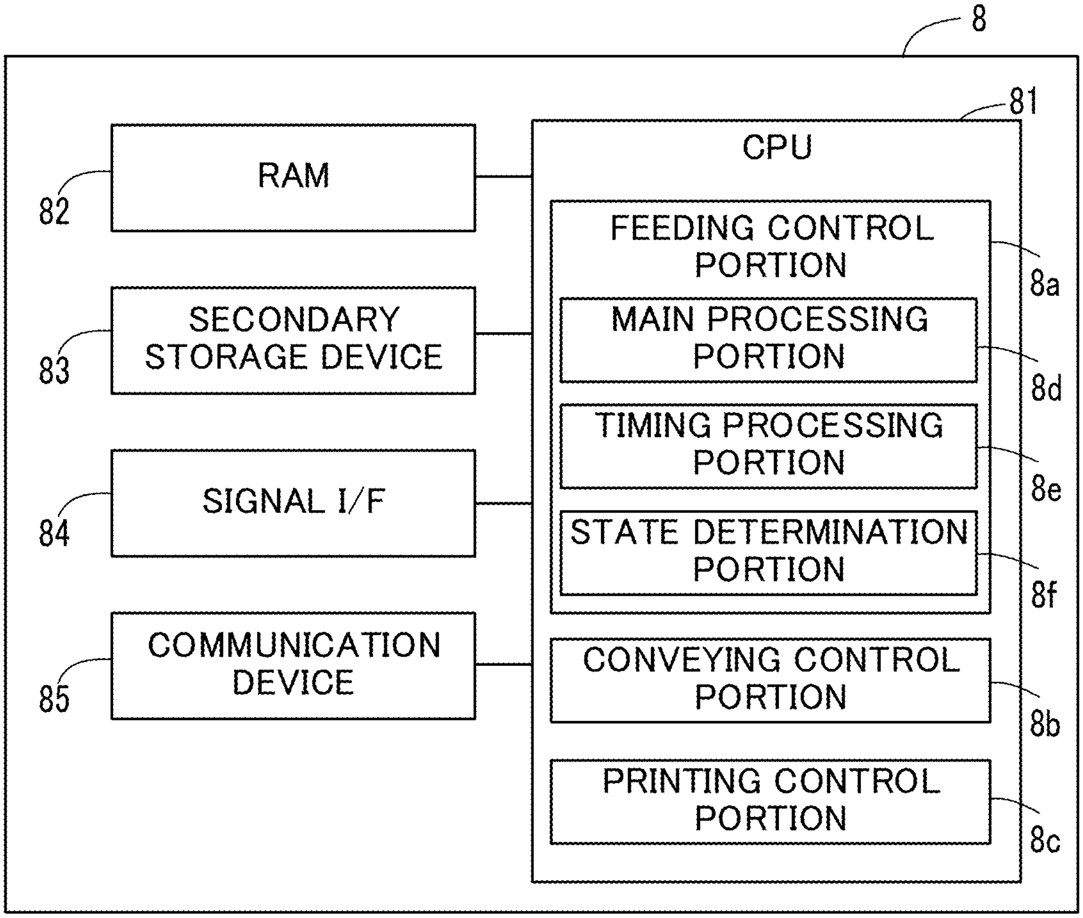
FIG. 2 is a block diagram showing a configuration of a control device in an image forming apparatus according to an embodiment.

Hereinafter, an embodiment according to the present disclosure will be described with reference to the drawings.

Note that the following embodiment is an example of a specific embodiment according to the present disclosure, and does not limit the technical scope of the present disclosure.

[Configuration of Image Forming Apparatus 10]

The image forming apparatus 10 according to an embodiment includes a sheet feeding device 2, a sheet conveying device 3, and a printing device 4. Furthermore, the image forming apparatus 10 includes a control device 8, an operation device 801, a display device 802, and the like.

The image forming apparatus 10 further includes a main housing 1 that houses the sheet feeding device 2, the sheet conveying device 3, and the printing device 4. The main housing 1 includes a lower housing 1*a* that forms the housing of the sheet feeding device 2.

The sheet feeding device 2 includes a sheet cassette 200, a feeding mechanism 20, a lift mechanism 21, and a fed sheet detecting device 25 (see FIG. 1). The feeding mechanism 20 includes a pickup roller 22, a feed-out roller 23, and a retard roller 24.

The sheet cassette 200 stores a stack of sheets 90 and is attached to the lower housing 1*a* so as to be removable. The sheet cassette 200 is an example of a sheet accommodating unit.

The pickup roller 22 and the feed-out roller 23 are each rotatably supported and arranged at a distance from each other. The pickup roller 22 comes in contact with an upper surface of a topmost sheet in the stack of sheets 90. The feeding mechanism 20 further includes a feeding motor 230 that rotates the pickup roller 22 and the feed-out roller 23 (see FIG. 3).

The feeding mechanism 20 executes a feeding process by rotating the pickup roller 22 and the feed-out roller 23. The feeding process is a process of feeding each sheet 9 from the stack of sheets 90 to the conveying path 30. The conveying path 30 is a path for each sheet 9.

The feed-out roller 23 and the retard roller 24 are arranged in an area between the sheet cassette 200 and the conveying path 30. The retard roller 24 is arranged below the feed-out roller 23 and faces the feed-out roller 23. The retard roller 24 forms a nip between the retard roller 24 and the feed-out roller 23 to sandwich each sheet 9 therebetween.

In the sheet feeding device 2, a sheet feeding direction D1 is a direction from the sheet cassette 200 toward the conveying path 30 (see FIG. 1). The feed-out roller 23 is arranged on the downstream side of the pickup roller 22 in the sheet feeding direction D1 (see FIGS. 1 and 3).

The pickup roller 22 is an example of a feeding rotating body. The feed-out roller 23 is an example of a feed-out rotating body. The feed-out roller 23 is arranged on the downstream side of the pickup roller 22 in the sheet feeding direction D1, and rotates together with the pickup roller 22.

The retard roller 24 is rotatably supported. The feeding mechanism 20 further includes a torque limiter 24*a* connected to a rotating shaft of the retard roller 24, and a spring 241 that biases the retard roller 24 toward the feed-out roller 23 (see FIG. 3).

When the feeding process is performed, torque in a forward rotation direction DR1 acts on the retard roller 24 from the rotating feed-out roller 23 or each sheet 9 heading toward the conveying path 30.

Figure 3:
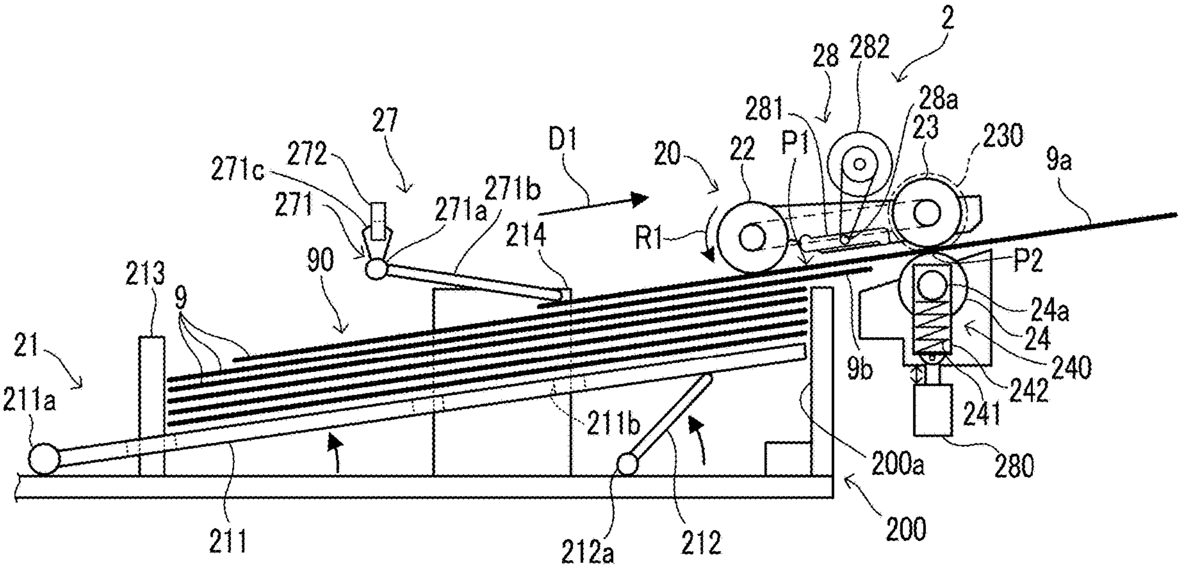
FIG. 3 is a configuration diagram of a sheet feeding device in an image forming apparatus according to an embodiment.

The torque limiter 24*a* limits the rotation of the retard roller 24 in the forward rotation direction DR1 when torque acting on the retard roller 24 in the forward rotation direction DR1 is equal to or less than a rated torque (see FIG. 3).

The retard roller 24 comes in contact with a leading edge of one or more accompanying sheets that are fed out together with each sheet 9 when the feeding process is executed, thereby blocking the accompanying sheets. Thus, the retard roller 24 separates the accompanying sheets from each sheet 9. The accompanying sheets are fed out of the sheet cassette 200 in a state where they overlap a lower surface of the topmost sheet in the stack of sheets 90.

Note that in a case in which the torque acting on the retard roller 24 from the rotating feed-out roller 23 or each sheet 9 heading toward the conveying path 30 exceeds the rated torque of the torque limiter 24*a*, the retard roller 24 rotates in the forward rotation direction DR1. Thus, the feed-out roller 23 or each sheet 9 is prevented from receiving an excessive frictional force from the retard roller 24.

The retard roller 24 is an example of a separating member that separates the accompanying sheets from the topmost sheet of the stack of sheets 90. Note that a non-rotating separation pad may be employed as the separating member instead of the retard roller 24.

In the following description, a position of each sheet 9 when the leading edge of each sheet 9 is aligned with the cassette leading edge wall surface 200*a* will be referred to as an initial reference position P1 (see FIGS. 1 and 3). The cassette leading edge wall surface 200*a* is an inner wall surface at an end portion on the downstream side of the sheet cassette 200 in the sheet feeding direction D1. In addition, a position between the feed-out roller 23 and the retard roller 24 is referred to as a separation position P2 (see FIGS. 1 and 3).

The lift mechanism 21 is arranged within the sheet cassette 200 and is supported by the sheet cassette 200. The lift mechanism 21 supports the stack of sheets 90 so that the sheets can be lifted and lowered.

The lift mechanism 21 is a mechanism that lifts the stack of sheets 90 from the separation position to the contact position. The separation position is a position where an upper surface of the topmost sheet in the stack of sheets 90 is separated downward from the pickup roller 22. The contact position is a position where the upper surface of the topmost sheet in the stack of sheets 90 comes in contact with the pickup roller 22.

The lift mechanism 21 includes a lift plate 211 and a push-up plate 212. The lift plate 211 is supported so as to be rotatable about a rotation shaft 211*a* arranged along a bottom plate of the sheet cassette 200. That is, the lift plate 211 can rotate up and down around the rotation shaft 211*a*.

The stack of sheets 90 is placed on the lift plate 211. When the lift plate 211 rotates upward, the stack of sheets 90 rotates upward, and when the lift plate 211 rotates downward, the stack of sheets 90 rotates downward.

The push-up plate 212 is arranged below the lift plate 211 and is rotatably supported about a rotation shaft 212*a* arranged along the bottom plate of the sheet cassette 200. That is, the push-up plate 212 can rotate up and down around the rotation shaft 212*a*.

The push-up plate 212 is rotated in a first rotation direction by a driving force of a motor (not shown), thereby pushing up the lift plate 211 and the stack of sheets 90 on the lift plate 211 upward. That is, the lift mechanism 21 rotates the push-up plate 212 in the first rotation direction to lift the stack of sheets 90 on the lift plate 211 from the separated position to the contact position.

On the other hand, the push-up plate 212 rotates in a second rotation direction by the driving force of the motor, thereby lowering the lift plate 211 and the stack of sheets 90 on the lift plate 211. That is, the lift mechanism 21 rotates the push-up plate 212 in the second rotation direction, thereby lowering the stack of sheets 90 on the lift plate 211 from the contact position to the separation position.

The lift mechanism 21 is an example of a displacement mechanism that displaces the stack of sheets 90. The lift mechanism 21, by lifting and lowering the stack of sheets 90, can switch between a contact state in which the stack of sheets 90 comes in contact with the pickup roller 22 and a separation state in which the stack of sheets 90 is separated from the pickup roller 22.

In the lift mechanism 21, the state in which the stack of sheets 90 is lifted to the contact position is the contact state, and the state in which the stack of sheets 90 is lowered to the separation position is the separation state. In the lift mechanism 21, an operation of lowering the lift plate 211 by rotating the push-up plate 212 in the second rotation direction is an operation of switching from the contact state to the separation state.

In the following description, operation of the lift mechanism 21 to lift the stack of sheets 90 to the contact position by lifting the lift plate 211 will be referred to as a lift plate lifting operation. The lift plate lifting operation is an operation in which the lift mechanism 21 switches from the separation state to the contact state.

Similarly, operation of the lift mechanism 21 to lower the stack of sheets 90 from the contact position to the separation position by lowering the lift plate 211 is referred to as a lift plate lowering operation. The lift plate lowering operation is an operation in which the lift mechanism 21 switches from the contact state to the separation state.

The fed sheet detecting device 25 detects each sheet 9 fed by the feeding process at a detection position P3 on the downstream side of the feed-out roller 23 in the sheet feeding direction D1. For example, the fed sheet detecting device 25 includes an actuator that is supported so as to be able to pivot, and a photosensor that detects that the actuator has pivoted. The actuator pivots when it comes into contact with each sheet 9 passing through the detection position P3.

The fed sheet detecting device 25 may be a transmission type photosensor or a reflection type photosensor that detects each sheet 9 passing through the detection position P3.

The sheet feeding device 2 further includes an attachment detection device 26 arranged in the lower housing 1*a* (see FIG. 1). The attachment detection device 26 detects whether the sheet cassette 200 is attached to the lower housing 1*a* and in an attached state, or is removed from the lower housing 1*a* and in a non-attached state.

For example, the attachment detection device 26 is a reflective photosensor or a microswitch that detects a part of the sheet cassette 200 in the attached state.

When the sheet cassette 200 is in the attached state, the lift mechanism 21 can lift the stack of sheets 90 to the contact position.

The sheet cassette 200 further includes an end cursor 213 and a pair of side cursors 214. The end cursor 213 is provided so as to be movable along the sheet feeding direction D1. The end cursor 213 is arranged along a rear end of the stack of sheets 90 placed on the lift plate 211. Thus, the end cursor 213 prevents the stack of sheets 90 from shifting from the initial reference position P1 to the upstream side in the sheet feeding direction D1.

The pair of side cursors 214 are provided so as to be capable of moving toward or away from each other in a width direction D2 perpendicular to the sheet feeding direction D1.

The pair of side cursors 214 are arranged at positions along both ends in the width direction D2 of the stack of sheets 90 placed on the lift plate 211. Thus, the pair of side cursors 214 prevent the stack of sheets 90 from shifting from a specific position in the width direction D2.

The sheet conveying device 3 conveys each sheet 9 fed by the sheet feeding device 2 along a conveying path 30. In the present embodiment, the sheet conveying device 3 includes a plurality of sets of conveying roller pairs 31 arranged along the conveying path 30 and a conveyed sheet detecting device 32.

The plurality of sets of conveying roller pairs 31 convey each sheet 9 by rotating. The plurality of sets of conveying roller pairs 31 include a pair of registration rollers 31*a* and a pair of discharge rollers 31*b*.

The pair of registration rollers 31*a* are arranged at a registration position P4 on the conveying path 30. The pair of discharge rollers 31*b* are arranged at an end portion of the conveying path 30.

The pair of registration rollers 31*a* temporarily stop each sheet 9 that is fed by the sheet feeding device 2 at the registration position P4, and then sends each sheet 9 to a printing position P5 on the conveying path 30.

The conveyed sheet detecting device 32 detects each sheet 9 that is fed to the conveying path 30 by the sheet feeding device 2 and then proceeds to the registration position P4. The conveyed sheet detecting device 32 has the same configuration as the fed sheet detecting device 25.

The pair of discharge rollers 31*b* discharge each sheet 9 that has passed through the printing position P5 from the conveying path 30 onto a discharge tray 101. As will be described later, each sheet 9 has an image formed on the sheet 9 at the printing position P5.

The printing device 4 forms an image on each sheet 9 conveyed by the sheet conveying device 3. That is, the printing device 4 forms an image on each sheet 9 fed by the sheet feeding device 2. The printing device 4 forms an image on each sheet 9 at the printing position P5 on the conveying path 30.

In the example shown in FIG. 1, the printing device 4 forms an image on each sheet 9 electrophotographically. In this case, the printing device 4 includes a laser scanning unit 40, one or more image forming portions 4*x*, a transfer device 44, and a fixing device 46.

In the example shown in FIG. 1, the printing device 4 includes a plurality of image forming portions 4*x* corresponding to a plurality of developing colors. Each image forming portion 4*x* includes a drum-shaped photoconductor 41, a charging device 42, a developing device 43 and a drum cleaning device 45. For example, the plurality of developing colors are cyan, yellow, magenta, and black.

In addition, the transfer device 44 includes an intermediate transfer belt 440, a plurality of primary transfer devices 441 corresponding to the plurality of image forming portions 4*x*, a secondary transfer device 442, and a belt cleaning device 443.

In each image forming portion 4*x*, the charging device 42 charges a surface of the photoconductor 41. The laser scanning unit 40 forms an electrostatic latent image on the surface of the photoconductor 41 of each image forming portion 4*x* by scanning with a laser beam.

In each image forming portion 4*x*, the developing device 43 supplies toner to the surface of the photoconductor 41 to develop the electrostatic latent image into a toner image.

The primary transfer device 441 transfers the toner image on the surface of the photoconductor 41 of each image forming portion 4*x* onto a surface of the intermediate transfer belt 440. Thus, the toner images of the plurality of developing colors are transferred onto the surface of the intermediate transfer belt 440. The primary transfer device 441 transfers the toner image on the surface of the intermediate transfer belt 440 onto each sheet 9 at the printing position P5. The fixing device 46 applies heat and pressure to the toner image transferred onto each sheet 9 to fix the toner image onto each sheet 9.

In each image forming portion 4*x*, the drum cleaning device 45 removes waste toner remaining on the surface of the photoconductor 41. The belt cleaning device 443 removes waste toner remaining on the surface of the intermediate transfer belt 440.

Note that the printing device 4 may be a device that forms an image on each sheet 9 using a method other than an electrophotographic method. For example, the printing device 4 may be a device that forms an image on each sheet 9 using an inkjet method.

When an inkjet printing device 4 is employed, the sheet conveying device 3 may include a belt conveying device that conveys each sheet 9 by a rotating endless belt.

The operation device 801 is a device that receives human operations. The operation device 801 includes, for example, operation buttons and a touch panel. The display device 802 is a device that displays information. The display device 802 includes, for example, a panel display device such as a liquid crystal display unit.

The control device 8 executes various types of data processing operations. Furthermore, the control device 8 controls devices such as the sheet feeding device 2, the sheet conveying device 3, the printing device 4, and the display device 802.

As shown in FIG. 3, the control device 8 includes a central processing unit (CPU) 81, a random access memory (RAM) 82, a secondary storage device 83, a signal interface 84, and other peripheral devices. The control device 8 further includes a communication device 85 and the like.

The CPU 81 is a processor that executes computer programs to execute various types of data processing and control operations. The RAM 82 is a computer-readable volatile storage device. The RAM 82 temporarily stores computer programs executed by the CPU 81 and data output and referenced by the CPU 81 in the course of executing various types of processes.

The secondary storage device 83 is a computer-readable non-volatile storage device. The secondary storage device 83 is capable of storing and updating the computer programs and various types of data. For example, one or both of a flash memory and a hard disk drive may be employed as the secondary storage device 83.

The signal interface 84 converts signals output by various types of sensors into digital data and transmits the converted digital data to the CPU 81. Furthermore, the signal interface 84 converts the control command output by the CPU 81 into a control signal, and transmits the control signal to a device to be controlled.

The communication device 85 executes communication with other devices such as a host device through a communication network such as a LAN. The CPU 81 transmits and receives data to and from the other devices via the communication device 85.

The CPU 81 includes a plurality of processing modules that are achieved by executing the computer programs. The plurality of processing modules include a feeding control portion 8*a*, a conveying control portion 8*b*, and a printing control portion 8*c*.

The feeding control portion 8*a* executes data processing and control related to the sheet feeding device 2. The feeding control portion 8*a* of the CPU 81 constitutes a part of the sheet feeding device 2.

The conveying control portion 8*b* executes data processing and control related to the sheet conveying device 3. The conveying control portion 8*b* of the CPU 81 constitutes a part of the sheet conveying device 3.

The printing control portion 8*c* executes data processing and control related to the printing device 4. The printing control portion 8*c* of the CPU 81 constitutes a part of the printing device 4.

The feeding control portion 8*a* includes a main processing portion 8*d*, a timing processing portion 8*e*, a state determination portion 8*f*, and the like.

The main processing portion 8*d* controls the start and end of the feeding process by controlling the operation and stopping of the feeding motor 230.

For example, when a printing request is input through the operation device 801 or the communication device 85, the main processing portion 8*d* activates the feeding motor 230 to cause the feeding mechanism 20 to start the feeding process.

The printing request may be a request to execute a single printing process or a request to execute a continuous printing process. The single printing process is a process in which an image is formed on one sheet 9. The continuous printing process is a process in which images are formed continuously on each of a plurality of sheets 9.

The timing processing portion 8*e* executes a first timing process for measuring an elapsed time from a time when the feeding process for each sheet 9 is started to a time when each sheet 9 is detected by the fed sheet detecting device 25. In the present embodiment, the feeding process is started when the feeding motor 230 starts operating.

The timing processing portion 8*e* is an example of a timing device that executes the first timing process. Note that the timing device may be achieved by other processors such as a digital signal processor (DSP) or circuits such as an application specific integrated circuit (ASIC).

Furthermore, the timing processing portion 8*e* also executes a second timing process for measuring an elapsed time from a time when each sheet 9 is detected by the fed sheet detecting device 25.

When the printing request is a request to execute a continuous printing process, the main processing portion 8*d* controls the timing of starting the second and subsequent feeding processes based on the time measured by the second timing process. Thus, each sheet 9 is fed to the conveying path 30 at an appropriate interval.

The state determination portion 8*f* executes a process of determining a state of feeding of each sheet 9 by the sheet feeding device 2. In the present embodiment, the state determination portion 8*f* determines the state of feeding of each sheet 9 by the sheet feeding device 2 based on the time measured by the first timing process.

The printing control portion 8*c* controls the laser scanning unit 40 to control the process of forming the electrostatic latent image on the surface of the photoconductor 41 of each of the plurality of image forming portions 4*x*. Thus, the printing control portion 8*c* controls the timing at which the toner image is formed on the surface of the photoconductor 41 of each of the plurality of image forming portions 4*x*.

The conveying control portion 8*b* stops the rotation of the registration roller pair 31*a* in response to detection of a sheet 9 by the conveyed sheet detecting device 32, and then rotates the registration roller pair 31*a* in response to the timing at which the toner image is formed in each of the plurality of image forming portions 4*x*. Thus, the conveying control portion 8*b* executes control to feed out each sheet 9 from the registration position P4 to the printing position P5 in synchronization with the timing at which the toner image is formed in each of the plurality of image forming portions 4*x*.

Figure 5:
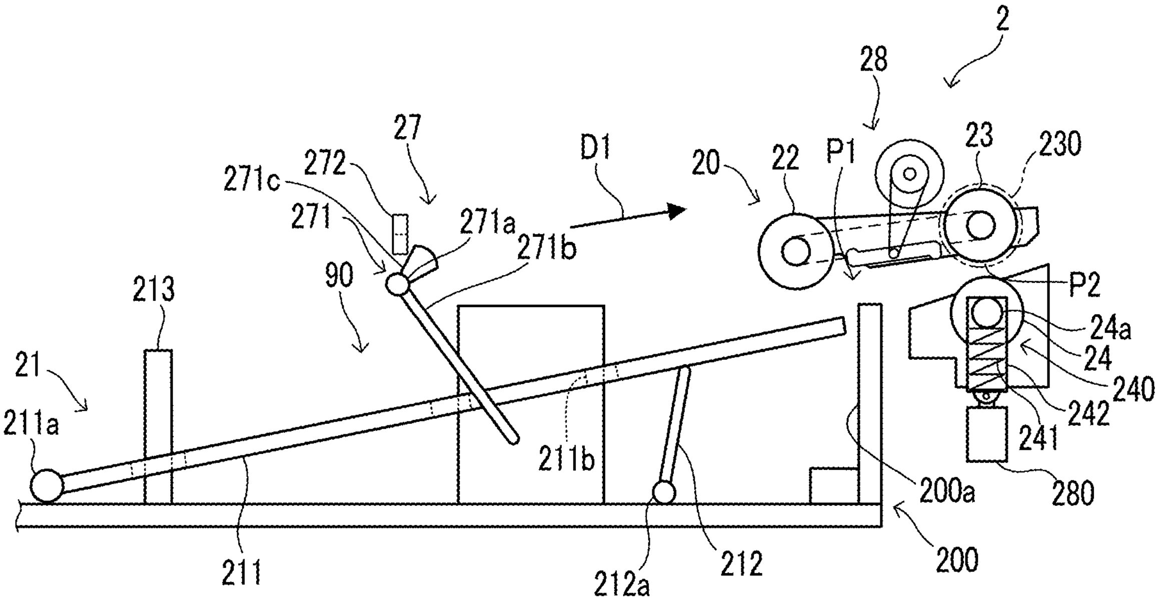
FIG. 5 is a diagram showing a sheet feeding device in an out-of-sheet state in an image forming apparatus according to an embodiment.

The sheet feeding device 2 further includes a sheet-out detecting device 27 (see FIGS. 3 and 5). The sheet-out detecting device 27 detects that there a no more remaining sheets 9 on the lift plate 211 that can be fed by the feeding mechanism 20.

In the present embodiment, the sheet-out detecting device 27 includes a pivoting member 271 pivotally supported above the lift plate 211, and an object detecting sensor 272 (see FIG. 3). The pivoting member 271 has a rotatably supported shaft portion 271*a*, and an arm portion 271*b* and a detected portion 271*c* each extending from the shaft portion 271*a*.

The pivoting member 271 is able to pivot around the shaft portion 271*a*. The arm portion 271*b* extends from the shaft portion 271 a toward the lift plate 211.

When one or more sheets 9 are present on the lift plate 211, the arm portion 271*b* comes into contact with an upper surface of one or more sheets 9 on the lift plate 211 (see FIG. 3).

In the following description, posture of the pivoting member 271 when the arm portion 271*b* is in contact with the upper surface of one or more sheets 9 will be referred to as a first posture. The first posture is a posture of the pivoting member 271 when there is no sheet-out state.

The lift plate 211 has an opening 211*b* formed therein (see FIG. 3). In a case in which there is a sheet-out state, the arm portion 271*b* penetrates the lift plate 211 through the opening 211*b* (see FIG. 5).

In the following description, a posture of the pivoting member 271 when the arm portion 271*b* penetrates the lift plate 211 through the opening 211*b* will be referred to as a second posture. The first posture is a posture of the pivoting member 271 when there is a sheet-out state.

The detected portion 271*c* is displaced in response to pivoting of the pivoting member 271. The object detecting sensor 272 detects the detection portion 271*c* when the pivoting member 271 is in one of the first posture and the second posture.

In the example shown in FIG. 3, the object detecting sensor 272 detects the detection portion 271*c* when the pivoting member 271 is in the first posture. When the pivoting member 271 is in the second posture, the detected portion 271*c* is outside of an area detected by the object detecting sensor 272 (see FIG. 5).

A detection signal from the object detecting sensor 272 when the lift mechanism 21 is lifting the stack of sheets 90 indicates whether or not there is a sheet-out state. In the example shown in FIGS. 3 and 5, the object detecting sensor 272 detects the detection portion 271*c* when there is no sheet-out state, and does not detect the detection portion 271*c* when there is a sheet-out state.

Figure 4:
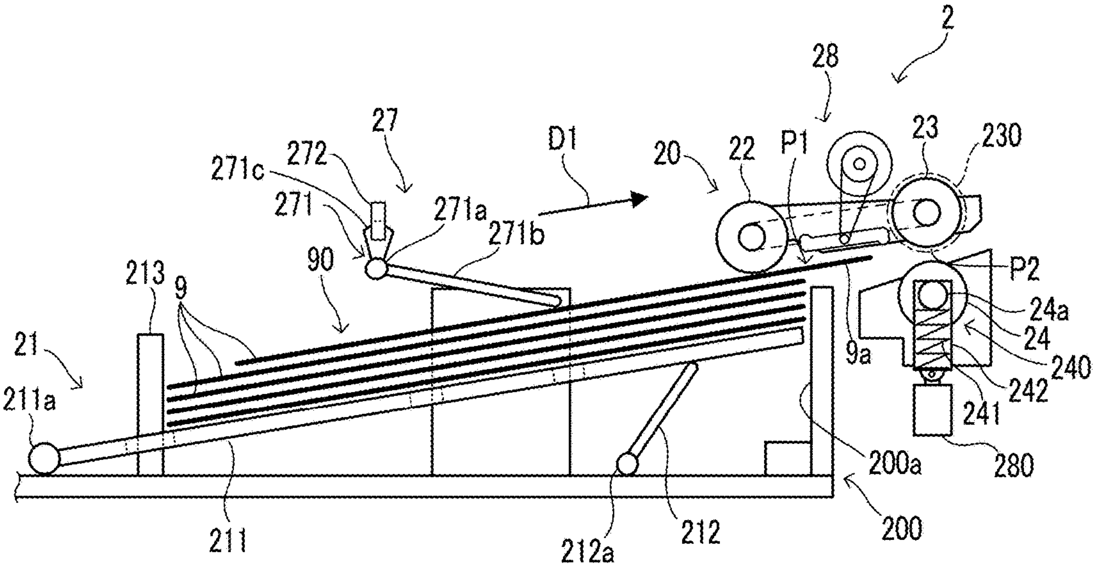
FIG. 4 is a diagram showing the sheet feeding device before a feeding process is started in an image forming apparatus according to an embodiment.

In the following description, one sheet of the stack of sheets 90 that is a target of the sheet feeding process will be referred to as a target sheet 9*a* (see FIGS. 3 and 4). The target sheet 9*a* is the topmost sheet in the stack of sheets 90. The target sheet 9*a* is also a sheet that is a target of the first timing process and the second timing process.

In addition, the sheet to be fed next to the target sheet 9*a* in the stack of sheets 90 and will become the target of the next feeding process is referred to as a next sheet 9*b* (see FIG. 3). The next sheet 9*b* is the second sheet from the top of the stack of sheets 90.

In the sheet feeding device 2, the measured time obtained by the first timing process of the timing processing portion 8*e* indicates the feeding state of each sheet 9.

For example, in a case in which a delay occurs in feeding each sheet 9 due to deterioration of a part in contact with each sheet 9, the delay time is reflected in the measured time. The feeding delay affects spacing between each of the sheets 9.

On the other hand, when the target sheet 9*a* is fed, other sheets overlapping the target sheet 9*a* may accompany the target sheet 9*a* and move to the downstream side in the sheet feeding direction D1 from the initial reference position P1. Deviation of the accompanying sheet from the initial reference position P1 affects the measurement time when the accompanying sheet is fed as the target sheet 9*a*.

Therefore, in order to correctly know the feeding state of each sheet 9 in the sheet feeding device 2, it is important to obtain the measurement time for the target sheet 9*a* when the target sheet 9*a* is not deviated from the initial reference position P1 as a reference time.

Therefore, it is desirable that the sheet feeding device 2 has a function of creating a situation in which the target sheet 9*a* does not deviate from the initial reference position P1.

Furthermore, it is desirable that the sheet feeding device 2 achieve a function for obtaining the measurement time for the target sheet 9*a* after creating a situation in which the target sheet 9*a* is not displaced from the initial reference position P1.

The sheet feeding device 2 includes a return mechanism 28 (see FIGS. 3, 6, and 7) that is a mechanism for preventing the target sheet 9*a* from deviating from the initial reference position P1.

Figure 6:
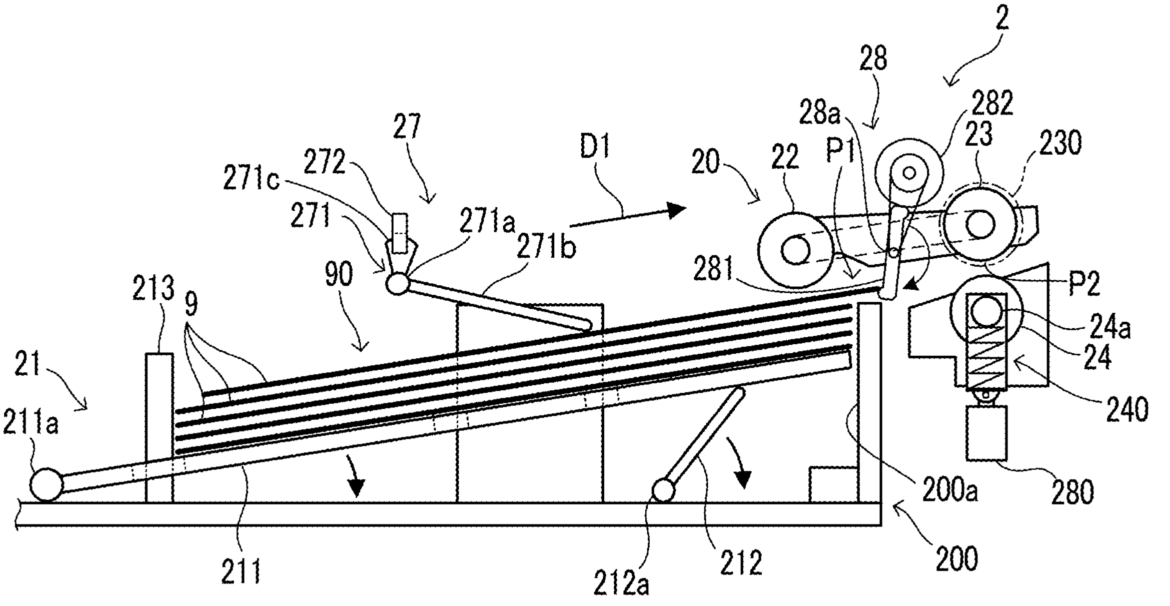
FIG. 6 is a diagram showing the sheet feeding device during execution of a return process in an image forming apparatus according to an embodiment.
Figure 7:
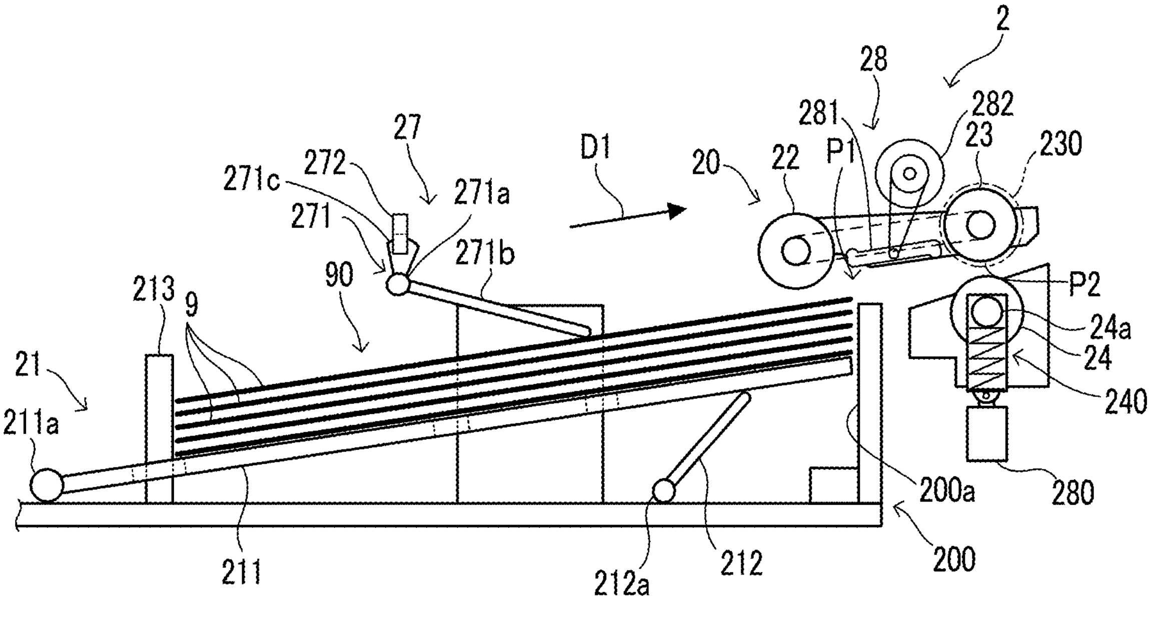
FIG. 7 is a diagram showing the sheet feeding device when a return process in an image forming apparatus according to an embodiment is completed.

The return mechanism 28 executes a sheet return process when the lift mechanism 21 executes the lift plate lowering operation. The sheet return process is a process for returning, to the upstream side in the sheet feeding direction D1, positionally deviated sheets among the stack of sheets 90 that have become positionally deviated toward the downstream side in the sheet feeding direction D1 from the initial reference position P1 (see FIGS. 6 and 7). FIG. 6 shows a state in which the sheet return process is being executed, and FIG. 7 shows a state after the sheet return process has been executed.

[Configuration of Return Mechanism 28]

The return mechanism 28 has a repelling member 281 supported rotatably around a shaft portion 28*a*, and a drive mechanism 282 that rotates the repelling member 281 (see FIG. 3).

The shaft portion 28*a* is arranged above a pre-separation path that is the path of each sheet 9 from the initial reference position P1 to the separation position P2. Note that the shaft portion 28*a* may be arranged below the pre-separation path. The pre-separation path is an example of a path from the initial reference position P1 to the conveying path 30.

The repelling member 281 is formed to extend from the shaft portion 28*a* in one direction or in a plurality of directions. In the present embodiment, the repelling member 281 is a plate-like member formed to extend in two directions from the shaft portion 28*a*.

For example, the repelling member 281 is an elastic member whose main material is rubber or elastomer resin.

When the drive mechanism 282 rotates the repelling member 281, a part of the repelling member 281 passes through the pre-separation path from the downstream side to the upstream side in the sheet feeding direction D1. The repelling member 281, by repelling the positionally deviated sheet toward the upstream side in the sheet feeding direction D1, returns the positionally deviated sheet to the upstream side in the sheet feeding direction D1 (see FIGS. 6 and 7).

The return mechanism 28 further includes a bias adjustment mechanism 280. The bias adjustment mechanism 280 reduces the bias of the retard roller 24 toward the feed-out roller 23 or releases the bias of the retard roller 24 toward the feed-out roller 23 when the sheet return process is executed.

The retard roller 24 is biased toward the feed-out roller 23 by a spring 241. In the present embodiment, the bias adjustment mechanism 280 releases the bias of the retard roller 24 toward the feed-out roller 23 (see FIGS. 6 and 7).

In the following description, operation of the bias adjustment mechanism 280 to reduce or release the bias of the retard roller 24 toward the feed-out roller 23 will be referred to as a counter-bias operation. In addition, operation of the bias adjustment mechanism 280 to bias the retard roller 24 toward the feed-out roller 23 is referred to as a biasing operation.

In the present embodiment, the feeding mechanism 20 further includes a movable support 242 supported so as to be movable toward and away from the feed-out roller 23 (see FIG. 3). The movable support 242 supports the retard roller 24 and the spring 241.

The retard roller 24, the spring 241, and the movable support 242 constitute a retard unit 240 that can be moved toward and away from the feed-out roller 23 (see FIG. 3).

The bias adjustment mechanism 280 moves the retard unit 240 in a direction toward the feed-out roller 23 or in a direction away from the feed-out roller 23. For example, the bias adjustment mechanism 280 is an actuator such as a solenoid.

The bias adjustment mechanism 280 releases the bias of the retard roller 24 when the lift mechanism 21 executes the lift plate lowering operation. The drive mechanism 282 rotates the repelling member 281 when the lift mechanism 21 executes the lift plate lowering operation.

In the return mechanism 28, a process in which the drive mechanism 282 rotates the repelling member 281 is the sheet return process. That is, the bias adjustment mechanism 280 releases the bias of the retard roller 24 toward the feed-out roller 23 when the sheet return process is executed.

By the bias adjustment mechanism 280 releasing the bias on the retard roller 24, even in a case in which a leading edge of the accompanying sheet has reached the downstream side of the separation position P2 in the sheet feeding direction D1, the accompanying sheet is smoothly moved toward the initial reference position P1 by the sheet return process.

In the sheet feeding device 2, a feeding control portion 8*a* executes sheet feeding control, which will be described later (see FIG. 8).

[Sheet Feeding Control]

An example of the sheet feeding control procedure will be described below with reference to the flowchart shown in FIG. 8. The sheet feeding control is executed by the feeding control portion 8*a*.

The sheet feeding control procedure is an example of a procedure for achieving a sheet feeding control method for controlling the sheet feeding device 2. The sheet feeding control procedure includes a procedure for achieving a sheet feeding state determination method.

The CPU 81 including the feeding control portion 8*a* is an example of a control device that achieves the sheet feeding control method and a processing device that achieves the sheet feeding state determination method. The main processing portion 8*d* starts the sheet feeding control when the printing request is input via the operation device 801 or the communication device 85.

In the following description, S101, S102, and so on represent identification codes of a plurality of steps in the sheet feeding control. In the sheet feeding control, first, the process of step S101 is executed.

<Step S101>

In step S101, the main processing portion 8*d* acquires pre-registered sheet size information from the secondary storage device 83. The sheet size information is information that indicates the size of the stack of sheets 90 accommodated in the sheet cassette 200.

For example, the sheet size information includes standard size information selected from a plurality of standard size candidates and sheet orientation information indicating orientation of the stack of sheets 90. The standard size information is information that specifies vertical and horizontal dimensions of the stack of sheets 90, and the sheet orientation information indicates whether the length of the stack of sheets 90 in the sheet feeding direction D1 is the vertical dimension or the horizontal dimension.

That is, the sheet size information includes sheet length information that indicates the length of the stack of sheets 90 accommodated in the sheet cassette 200 in the sheet feeding direction D1. The length indicated by the sheet length information is the vertical dimension or the horizontal dimension in the standard size information.

The main processing portion 8*d* inputs the sheet size information in advance via the operation portion 801 or the communication portion 85 and registers the sheet size information in the secondary storage device 83.

After executing the process of step S101, the main processing portion 8*d* shifts the process to step S102.

<Step S102>

In step S102, the main processing portion 8*d* determines whether the feeding timing has arrived or not.

For example, the feeding timing is an initial feeding timing or a subsequent feeding timing. The initial feeding timing is timing when the printing device 4 is ready to operate after the printing request is input.

The subsequent feeding timing is timing at which feeding of the second and subsequent sheets 9 starts when the printing request is a request for a continuous printing process.

More specifically, the subsequent feeding timing is the timing at which the second measurement time corresponding to the immediately previous feeding process reaches a feeding waiting time. The feeding waiting time is time required from a time when the leading edge of each sheet 9 reaches the detection position P3 until a trailing edge of each sheet 9 exceeds the position along the cassette leading edge wall surface 200*a* by a predetermined amount.

In step S101, the main processing portion 8*d* sets a reference waiting time, which is one of a plurality of preset candidate waiting times that corresponds to the sheet length information, as the feeding waiting time.

The main processing portion 8*d* waits until it is determined that the feeding timing has arrived. When it is determined that the feeding timing has arrived, the main processing portion 8*d* shifts the processing to step S103.

<Step S103>

In step S103, the main processing portion 8*d* causes the feeding mechanism 20 to start the feeding process. Thus, the pickup roller 22 and the feed-out roller 23 are rotated, and the target sheet 9*a* in the stack of sheets 90 is fed from the lift plate 211 toward the conveying path 30 (see FIG. 3).

Furthermore, when the feeding process is started in step S103, the timing processing portion 8*e* starts the first timing process.

After executing the process of step S103, the main processing portion 8*d* shifts the process to step S104.

<Step S104>

In step S104, in a case in which the fed sheet detecting device 25 transitions from the no-sheet detection state to the sheet detecting state, the timing processing portion 8*e* shifts the process to step S107.

The timing processing portion 8*e* ends the first timing process when the fed sheet detecting device 25 transitions to the sheet detection state. Thus, the timing processing portion 8*e* determines a target measurement time T1*a*, which is the result of the first timing process for the target sheet 9*a* (see FIGS. 12 to 14).

Figure 12:
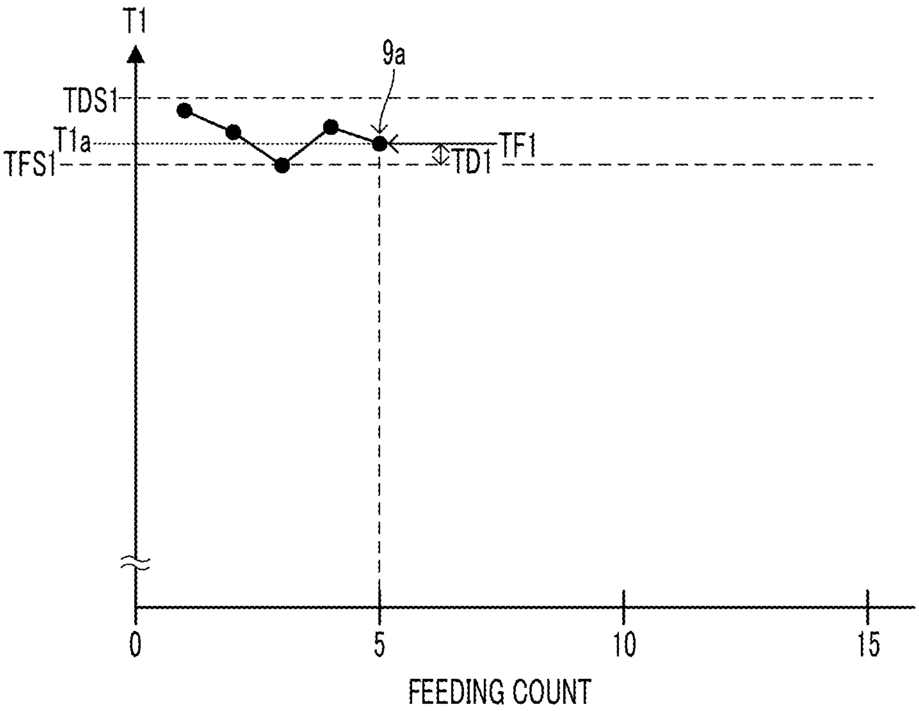
FIG. 12 is a diagram showing a first example of a relationship between a target measurement time, a target feeding time, and a delay time in an image forming apparatus according to an embodiment.
Figure 13:
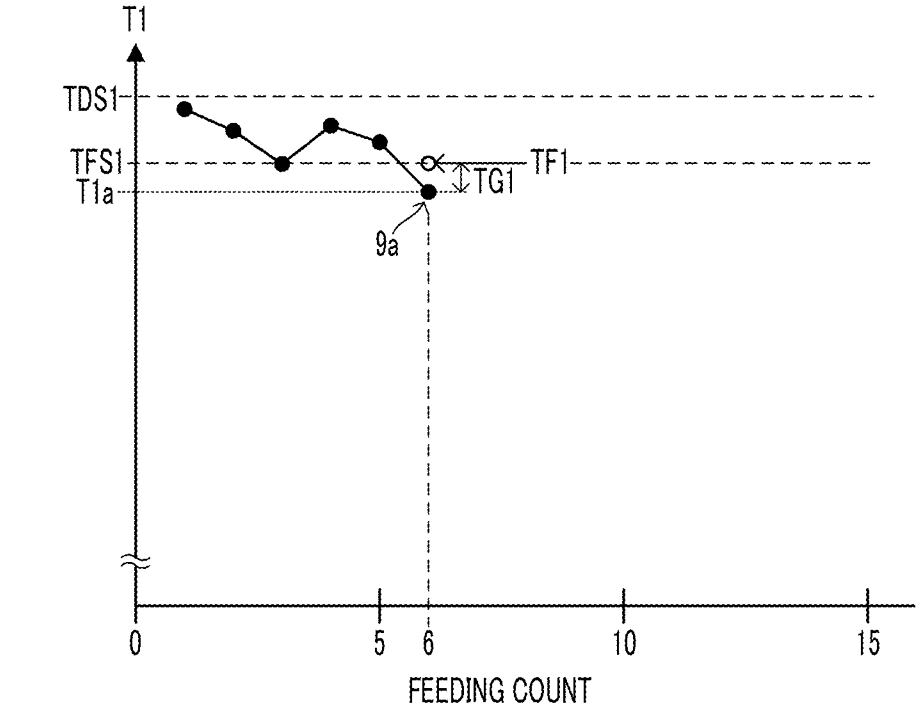
FIG. 13 is a diagram showing a second example of a relationship between a target measurement time, a target feeding time, and a delay time in an image forming apparatus according to an embodiment.
Figure 14:
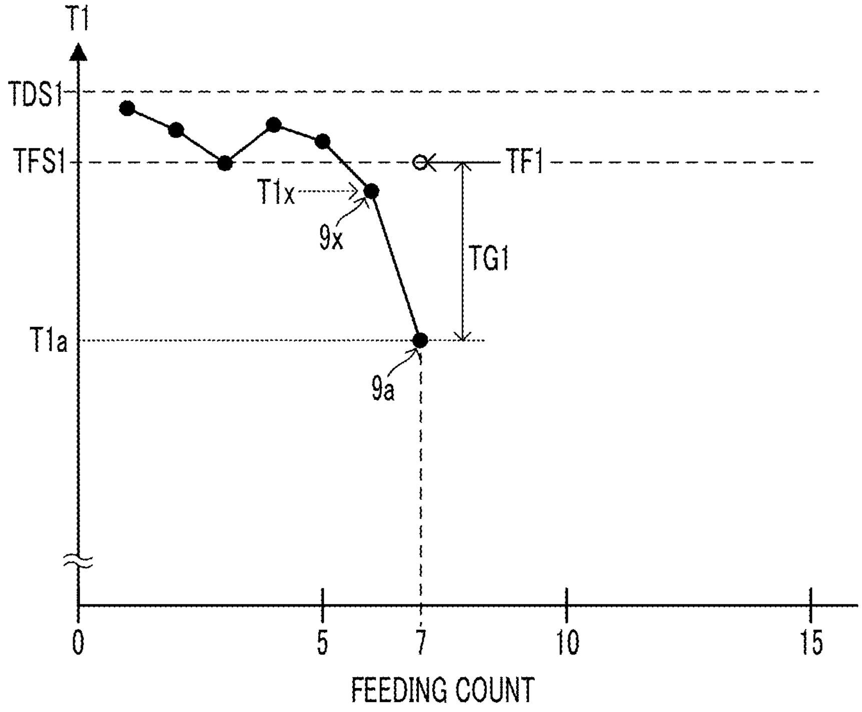
FIG. 14 is a diagram showing a third example of a relationship between a target measurement time, a target feeding time, and a delay time in an image forming apparatus according to an embodiment.

FIGS. 12 to 14 show an example of the transition of the target measurement time T1*a* according to the feeding count when the feeding process is repeated.

In step S104, in a case in which the fed sheet detecting device 25 does not transition from the no-sheet detection state to the sheet detecting state, the timing processing portion 8*e* shifts the process to step S105. In this case, the timing processing portion 8*e* continues the first timing process.

<Step S105>

In step S105, the timing processing portion 8*e* selects the next process depending on whether or not the time measured by the first timing process has exceeded a preset upper limit time. The upper limit time is a time used to detect an empty feeding state in which the feeding mechanism 20 cannot feed a target sheet 9*a*.

In a case in which the time measured by the first timing process does not exceed the upper limit time, the timing processing portion 8*e* shifts the process to step S104. Thus, the timing processing portion 8*e* continues the first timing process until the fed sheet detecting device 25 transitions from the no-sheet detection state to the sheet detection state, provided that the time measured by the first timing process does not exceed the upper limit time.

On the other hand, in a case in which the time measured by the first timing process exceeds the upper limit time under the condition that the fed sheet detecting device 25 does not transition to the sheet detection state, the timing processing portion 8*e* shifts the process to step S106.

<Step S106>

In step S106, the main processing portion 8*d* outputs an error notification indicating that the empty feeding state has occurred via one or both of the display device 802 and the communication device 85.

Each of the display device 802 and the communication device 85 is an example of an information output device.

After executing the process of step S106, the main processing portion 8*d* ends the feeding control. Thus, the feeding control is stopped.

<Step S107>

In step S107, the timing processing portion 8*e* starts the second timing process.

After executing the process of step S107, the main processing portion 8*d* shifts the process to step S108.

Note that when the processing from step S107 onwards is being executed, the conveying control portion 8*b* causes the sheet conveying device 3 to execute the process of conveying the target sheet 9*a* along the conveying path 30, and the printing control portion 8*c* causes the printing device 4 to execute the process of forming an image on the target sheet 9*a*.

<Step S108>

In step S108, the state determination portion 8*f* selects the next process depending on whether the feeding process executed in step S103 corresponds to one or more reference feeding processes that satisfy a predetermined reference feeding condition.

The reference feeding condition is a condition indicating a situation in which there is no positional deviation of the target sheet 9*a* from the initial reference position P1 at the time the feeding process is started, or the positional deviation is assumed to be small enough to be negligible.

When the feeding process is executed, the next sheet 9*b* may be fed out as the accompanying sheet from the initial reference position P1 in the sheet feeding direction D1 (see FIG. 3). In this case, the position of the next sheet 9*b* deviates in the sheet feeding direction D1 with respect to the initial reference position P1. The next sheet 9*b* in which the positional deviation occurs is fed as a new target sheet 9*a* in the next feeding process.

When the target sheet 9*a* in which the positional deviation occurs is fed, the target measurement time Ta is shorter than when the target sheet 9*a* in which the positional deviation does not occur is fed. FIGS. 12 and 13 show an example in which the target measurement time T1*a* in the sixth feeding process is shorter than the measurement time T1 in the fifth feeding process because the positional deviation of the next sheet 9*b* occurred in the fifth feeding process.

In addition, FIGS. 12 to 14 show an example in which the positional deviation of the target sheet 9*a* increases as the number of feeding processes increases. As shown in FIGS. 12 to 14, when the number of times the feeding process is performed after the lift mechanism 21 lifts the stack of sheets 90 to the contact position is small, the positional deviation of the target sheet 9*a* often does not occur or is small.

Furthermore, even in a case in which the lift mechanism 21 lifts or lowers the stack of sheets 90 under the condition where the positional deviation occurs, the positional deviation will not be eliminated.

In the present embodiment, the reference feeding condition is a condition that the feeding process is performed once, or a plurality of times, after the lift mechanism 21 first lifts the stack of sheets 90 from the separation position to the contact position after the sheet return process is executed by the return mechanism 28.

For example, the reference feeding condition is a condition that the feeding process is executed for the first or second time after the lift mechanism 21 first lifts the stack of sheets 90 to the contact position after the sheet return process is executed. Alternatively, the reference feeding condition is a condition that the feeding process is executed from an ith time to a jth time after the lift mechanism 21 first lifts the stack of sheets 90 to the contact position after the sheet return process is executed. i and j are positive integers less than 10, for example.

In addition, in the first feeding process in a state where the lift mechanism 21 lifts the stack of sheets 90 to the contact position, a relatively long target measurement time T1*a* may be measured. Therefore, it may be possible to exclude the first feeding process from the reference feeding condition.

Therefore, under the circumstances where the reference feeding condition is satisfied, there is a higher possibility that the positional deviation of the target sheet 9*a* does not occur.

In a case in which the feeding process executed in step S103 is the reference feeding process, the state determination portion 8*f* shifts the process to step S109. On the other hand, in a case in which the feeding process executed in step S103 does not correspond to one or more reference feeding processes, the state determination portion 8f shifts the process to step S112.

Note that the timing at which the sheet return process is executed will be described later.

<Step S109>

In step S109, the state determination portion 8f derives a reference feeding time TFS1 based on one or more target measurement times T1a measured when the reference feeding process is executed one or more times.

For example, the state determination portion 8f derives one target measurement time T1a measured when the reference feeding process is executed one time as the reference feeding time TFS1.

Alternatively, the state determination portion 8f sets the reference feeding time TFS1 as a representative value of a plurality of target measurement times T1a measured when the reference feeding process is executed a plurality of times. For example, the representative value of the plurality of target measurement times T1a is an average value, minimum value, or median value of the plurality of target measurement times T1a.

Furthermore, the state determination portion 8f records information about the set reference feeding time TFS1 in the secondary storage device 83.

The reference feeding time TFS1 is a reference value of the target measurement time T1a in the feeding process under a situation where the positional deviation of the target sheet 9a does not occur or the positional deviation is assumed to be negligibly small.

The reference feeding time TFS1 is used to determine whether or not the positional deviation of each sheet 9 has occurred, and to derive the amount of positional deviation.

The amount of positional deviation is the amount of deviation of the position of each sheet 9 from the initial reference position P1 at the time when the feeding process of each sheet 9 is started.

Note that the initial value of the reference feeding time TFS1 is a predetermined reference time. The predetermined reference time is a time determined by a designed feeding speed of the feeding mechanism 20 and a path length from the initial reference position P1 to the detection position P3.

The one or more target measurement times T1a measured by the timing processing portion 8e when the reference feeding process is executed one or more times are examples of one or more reference measurement times. In the present embodiment, one or more of the reference measurement times are used to derive a reference feeding time TFS1.

Note that the target measurement time T1a that will be the target of processing in steps S110 and S111 described later is the time measured by the timing processing portion 8e for the target sheet 9a that is fed after one or more reference feed sheets have been fed. From the time when the process of step S109 is executed until the time when the process of steps S110 and S111 is executed, the lift mechanism 21 maintains the stack of sheets 90 at the contact position.

After executing the process of step S109, the state determination portion 8f shifts the process to step S112.

<Step S110>

On the other hand, in step S110, the state determination portion 8f derives the positional deviation amount by comparing the target measurement time T1a with a preset reference feeding time TFS1.

More specifically, in a case in which the target measurement time T1a is equal to or greater than the reference feeding time TFS1, the state determination portion 8f determines 0 as the positional deviation amount.

On the other hand, in a case in which the target measurement time T1a is shorter than the reference feeding time TFS1, the state determination portion 8f derives the positional deviation amount according to a difference between the target measurement time T1a and the reference feeding time TFS1.

More specifically, the state determination portion 8f derives the difference between the target measurement time T1a and the reference feeding time TFS1 as a positional deviation time TG1 (see FIGS. 13 and 14). The positional deviation time TG1 is the time required to feed the target sheet 9a by a distance corresponding to the positional deviation amount.

Furthermore, the state determination portion 8f derives the positional deviation amount by multiplying the positional deviation time TG1 by the reference feeding speed. Note that the positional deviation time TG1 may be derived as the positional deviation amount.

The reference feeding speed is derived by dividing a path length from the initial reference position P1 to the detection position P3 by the reference feeding time TFS1. Note that the state determination portion 8f may derive the reference feeding speed in advance in step S109.

A state in which the positional deviation amount is greater than 0 is a state in which the positional deviation occurs. In a case in which the positional deviation amount is 0, the positional deviation time TG1 is 0.

After executing the process of step S110, the state determination portion 8f shifts the process to step S111.

<Step S111>

In step S111, the state determination portion 8f derives the target feeding time TF1 by adding the positional deviation time TG1 to the target measurement time T1a (see FIGS. 13 to 14).

The target feeding time TF1 is the target measurement time T1a corrected by the positional deviation time TG1. The target feeding time TF1 is the time required to feed the target sheet 9a from the initial reference position P1 to the detection position P3.

Note that the positional deviation amount and the target feeding time TF1 are each an example of a feeding parameter that indicates the feeding state of each target sheet 9a.

A difference between the target feeding time TF1 and a delay determination time TDS1 (described later) is the delay time TD1 (see FIGS. 12 to 14). The delay time TD1 is a time that represents the degree of delay in feeding caused by the pickup roller 22 or the feed-out roller 23 sliding on the top surface of each sheet 9.

After executing the process of step S111, the state determination portion 8f shifts the process to step S112.

<Step S112>

In step S112, the main processing portion 8d executes a first return control, which will be described later (see FIG. 9). In the first return control, the main processing portion 8d causes the return mechanism 28 to execute the sheet return process depending on the situation.

After executing the process of step S112, the main processing portion 8d shifts the process to step S113.

<Step S113>

In step S113, the main processing portion 8d selects the next process depending on whether or not all the feeding processes corresponding to the printing requests have been completed.

In a case in which all of the feeding processes corresponding to the printing requests have not yet been completed, the main processing portion 8*d* shifts the processing to step S102. In this case, in step S102, the main processing portion 8*d* executes a process of determining the subsequent feeding timing based on the result of the second timing process started in step S107.

On the other hand, in a case in which all the feeding processes corresponding to the printing requests have been completed, the main processing portion 8*d* shifts the processing to step S114.

<Step S114>

Figure 10:
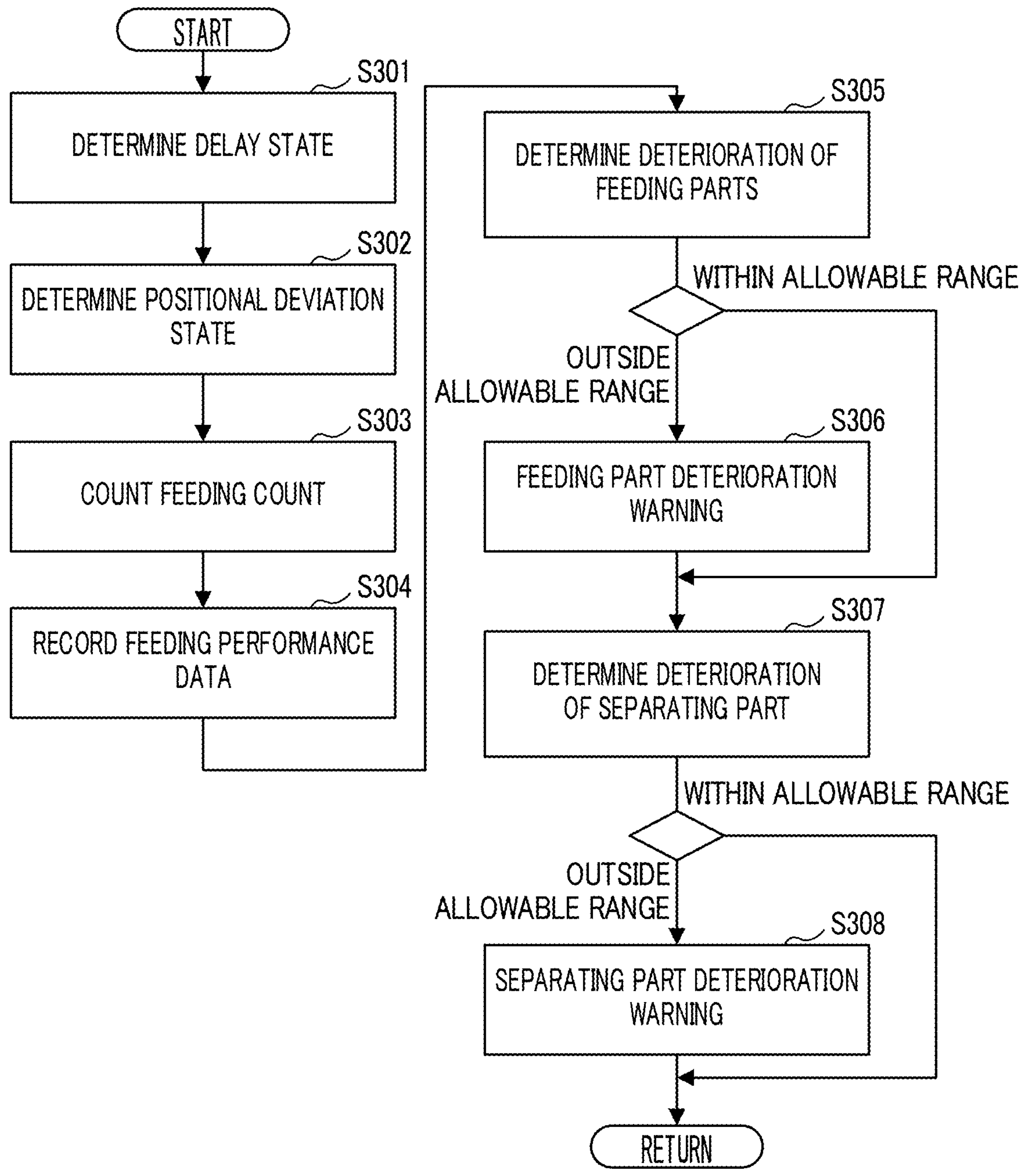
FIG. 10 is a flowchart showing an example of a part deterioration determination process in an image forming apparatus according to an embodiment.

In step S114, the state determination portion 8*f* executes a part deterioration determination process, which will be described later (see FIG. 10). The part deterioration determination process is a process for determining the deterioration state of the parts of the feed mechanism 20 based on the results of deriving the feed parameters.

After the state determination portion 8*f* executes the process of step S114, the main processing portion 8*d* ends the sheet feeding control.

[First Return Control] Next, an example of a procedure of the first return control will be described with reference to the flowchart shown in FIG. 9. The first return control is executed by the main processing portion 8*d*.

In the following description, S201 to S203 represent identification codes of three steps in the first return control. In the first return control, first, the process of step S201 is executed.

<Step S201>

In step S201, the main processing portion 8*d* determines whether or not a first return condition is met, and selects the next process depending on the determination result. The first return condition includes a separation failure condition that the positional deviation amount derived in step S110 exceeds a separation failure determination value.

The separation failure determination value is a value set corresponding to the path length from the initial reference position P1 to the separation position P2. For example, the separation failure determination value is a length obtained by adding a predetermined correction value to the path length from the initial reference position P1 to the separation position P2. In addition, the path length from the initial reference position P1 to the separation position P2 may be set as the separation failure determination value.

In the present embodiment, the first return condition is a logical product of the separation failure condition and a sheet remaining condition in which the sheet-out detecting device 27 has not detected the sheet-out state. The separation failure condition is an example of a positional deviation condition related to the positional deviation amount.

In a case in which the first return condition is met, the main processing portion 8*d* shifts the processing to step S202. On the other hand, in a case in which the first return condition is not satisfied, the main processing portion 8*d* ends the first return control.

<Step S202>

In step S202, the main processing portion 8*d* causes the bias adjustment mechanism 280 to execute the counter-bias operation, causes the lift mechanism 21 to execute the lift plate lowering operation, and further causes the return mechanism 28 to execute the sheet return process.

In the present embodiment, a process of causing the return mechanism 28 to execute the sheet return process is a process of rotating the repelling member 281 by operating the drive mechanism 282.

By executing the process of step S202, the accompanying sheet that has reached the separation position P2 is returned to the initial reference position P1 or a position close to the initial reference position P1.

When the sheet returning process is executed, the main processing portion 8*d* may rotate the pickup roller 22 and the feed-out roller 23 in a direction opposite to the rotation direction when the feeding process is executed.

After executing the process of step S202, the main processing portion 8*d* executes the process of step S203.

<Step S203>

In step S203, the main processing portion 8*d* causes the return mechanism 28 to stop the sheet return process, causes the bias adjustment mechanism 280 to execute the biasing operation, and causes the lift mechanism 21 to execute the lift plate lifting operation.

After executing the process of step S203, the main processing portion 8*d* ends the first return control.

[Part Deterioration Determination Process]

Next, an example of a procedure for the part deterioration determination process will be described with reference to the flowchart shown in FIG. 10. The part deterioration determination process is executed by the state determination portion 8*f*.

The procedure of the part deterioration determination process is an example of a procedure for achieving the sheet feeding state determination method. The CPU 81 including the state determination portion 8*f* is an example of a processing device that achieves the sheet feeding state determination method.

In the following description, S301, S302, and so on represent identification codes of a plurality of steps in the part deterioration determination process. In the part deterioration determination process, first, the process of step S301 is executed.

<Step S301>

In step S301, the state determination portion 8*f* determines whether the feeding of the target sheet 9*a* is in a delayed state by comparing the target feeding time TF1 obtained in step S206 or S207 with a preset delay determination time TDS1 (see FIGS. 12 to 13).

The delay determination time TDS1 is a time shorter than the upper limit time.

When the target feeding time TF1 exceeds the delay determination time TDS1, the state determination portion 8*f* counts a delay count, which is a number of times the delay state occurs. The delay count is the number of times that the target feeding time TF1 exceeds the delay determination time TDS1.

In step S301, the state determination portion 8*f* may count a plurality of individual delay counts, each of which is a delay count.

The plurality of individual delay counts are the number of times that the target feeding time TF1 exceeds the plurality of individual delay determination times, respectively. Each of the plurality of individual determination times is an example of a delay determination time TDS1, and is a time equal to or longer than the reference feeding time TFS1. Thus, the delay state of feeding of each sheet 9 is classified into a plurality of delay degrees according to the plurality of individual delay determination times, and the plurality of individual delay counts corresponding to the plurality of delay degrees are counted.

Note that the plurality of individual delay determination times are shorter than the upper limit time.

In step S301, the state determination portion 8*f* may count a first delay count and a second delay count.

The first delay count is the number of times the positional deviation amount does not exceed a positional deviation determination value and the target measurement time T1*a* exceeds the delay determination time TDS1. The second delay count is the number of times that the positional deviation amount exceeds the positional deviation determination value and the target measurement time T1*a* exceeds the delay determination time TDS1.

After executing the process of step S301, the state determination portion 8*f* shifts the process to step S302.

<Step S302>

In step S302, the state determination portion 8*f* determines the positional deviation state of the target sheet 9*a* by comparing the positional deviation amount derived in step S111 with the positional deviation determination value and a separation failure determination value.

The positional deviation determination value is a value smaller than the separation failure determination value.

More specifically, the state determination portion 8*f* counts a separation failure count when the positional deviation amount exceeds the separation failure determination value. The separation failure count is the number of times the positional deviation amount exceeds the separation failure determination value.

In a case in which the positional deviation amount exceeds the separation failure determination value, it is considered that a separation failure state of the target sheet 9*a* has occurred. The separation failure state is a state in which a leading edge of the target sheet 9*a* at the start of the feeding process reaches the separation position P2 or a position on the downstream side of the separation position P2 in the sheet feeding direction D1.

In step S302, the state determination portion 8*f* may count a plurality of individual separation failure counts, each of which is a separation failure count.

The plurality of individual separation failure counts are the number of times that the positional deviation amount exceeds a plurality of individual separation failure determination values. Each of the plurality of individual separation failure determination values is an example of the separation failure determination value. Thus, the separation failure state of each sheet 9 is classified into a plurality of separation failure degrees according to the plurality of individual separation failure determination values, and the plurality of individual separation counts corresponding to the plurality of separation failure degrees are counted.

In step S302, the state determination portion 8*f* may derive an excess positional deviation amount that indicates the amount by which the positional deviation amount exceeds the separation failure determination value. More specifically, the excess positional deviation amount is a difference between the positional deviation amount and the separation failure determination value.

Furthermore, the state determination portion 8*f* counts a positional deviation count when the positional deviation amount does not exceed the separation failure determination value and exceeds the positional deviation determination value. On the other hand, in a case in which the positional deviation amount does not exceed the positional deviation determination value, the state determination portion 8*f* counts a no positional deviation count.

The positional deviation count is an example of the number of times the positional deviation amount exceeds the positional deviation determination value. The no positional deviation count is the number of times the positional deviation amount does not exceed the positional deviation determination value.

The positional deviation state in which the positional deviation count is counted is a state in which the leading edge of the target sheet 9*a* at the start of the feeding process reaches a predetermined range between the initial reference position P1 and the separation position P2.

After executing the process of step S302, the state determination portion 8*f* shifts the process to step S303.

<Step S303>

In step S303, the state determination portion 8*f* counts a feeding count, which is the number of times the feeding process has been performed.

After executing the process of step S303, the state determination portion 8*f* shifts the process to step S304.

<Step S304>

In step S304, the state determination portion 8*f* records in the secondary storage device 83 the feeding performance data including information on the record of various types of feeding states obtained in steps S301 to S303.

More specifically, the state determination portion 8*f* records feeding performance data including information on the feeding count, the delay count, and the separation failure count in the secondary storage device 83.

The state determination portion 8*f* may further record the feeding performance data including information on the plurality of individual delay counts in the secondary storage device 83.

The state determination portion 8*f* may further record the feeding performance data including information on the first delay count and the second delay count in the secondary storage device 83.

The state determination portion 8*f* may further record the feeding performance data including information on the positional deviation count and the no positional deviation count in the secondary storage device 83.

The state determination portion 8*f* may further record the feeding performance data including information on the plurality of individual separation failure counts in the secondary storage device 83.

The state determination portion 8*f* may further record the feeding performance data including information on the positional deviation excess amount in the secondary storage device 83. In this case, the feeding performance data is an example of performance data of the positional deviation excess amount.

After executing the process of step S304, the state determination portion 8*f* shifts the process to step S305.

<Step S305>

In step S305, the state determination portion 8*f* determines whether the feeding parts have deteriorated based on the feeding performance data.

In the present embodiment, the feeding parts are the pickup roller 22 and the feed-out roller 23. In the following description, a state in which the degree of deterioration of the feeding parts is determined to be outside the allowable range will be referred to as a feeding part deterioration state. The degree of deterioration of the feeding parts is an example of a determination result of the deterioration state of the feeding mechanism 20.

For example, the state determination portion 8*f* determines that the feeding part deterioration state has occurred when the delay count exceeds a preset threshold value of the delay count.

In addition, a plurality of individual delay threshold values corresponding to the plurality of individual delay counts may be set in advance. In this case, the state determination portion 8*f* determines that the feeding parts are in a deteriorated state when each of the plurality of individual delay counts exceeds each of the plurality of individual delay count threshold values.

In addition, the state determination portion 8*f* may determine that the feeding part is in a deteriorated state when the first delay count exceeds a preset first delay count threshold value. Similarly, the state determination portion 8*f* may determine that the feeding parts are in a deteriorated state when the second delay count exceeds a preset second delay count threshold value.

In addition, the state determination portion 8*f* may determine that the feeding parts are in a deteriorated state when the frequency of the first delay count with respect to the no positional deviation count exceeds a preset first delay frequency threshold value. Similarly, the state determination portion 8*f* may determine that the feeding parts are in a deteriorated state when the frequency of the second delay count with respect to the positional deviation count exceeds a preset second delay frequency threshold value.

By using the first delay count and the second delay count for deterioration determination, detailed deterioration determination is possible that reflects a difference in a relationship between the frequency of feeding delays due to the magnitude of the positional deviation amount and part deterioration.

The state determination portion 8*f* shifts the process to step S306 when it is determined that the degree of deterioration of the feeding parts is outside of an allowable range. On the other hand, in a case in which it is determined that the degree of deterioration of the feeding parts is within the allowable range, the state determination portion 8*f* shifts the process to step S307.

<Step S306>

In step S306, the state determination portion 8*f* outputs a feeding part deterioration alarm via one or both of the display device 802 and the communication device 85. The feeding part deterioration alarm is an alarm that prompts maintenance or replacement of the feeding parts.

For example, the state determination portion 8*f* causes the display device 802 to display information about the feeding part deterioration alarm. In addition, the state determination portion 8*f* may also transmit information on the feeding part deterioration alarm to a manager's terminal via the communication device 85.

After executing the process of step S306, the state determination portion 8*f* shifts the process to step S307.

<Step S307>

In step S307, the state determination portion 8*f* determines whether the separation part has deteriorated based on the feeding performance data.

In the present embodiment, the separation part is the retard roller 24. In the following description, a state in which the degree of deterioration of the separation part is determined to be outside an allowable range will be referred to as a separation part deterioration state. The degree of deterioration of the separation part is an example of the determination result of the deterioration state of the feeding mechanism 20.

For example, the state determination portion 8*f* determines that a separation part deterioration state has occurred when the separation failure count exceeds a preset separation failure count threshold value.

In addition, the state determination portion 8*f* may determine that the separation part is in a deteriorated state when the frequency of the separation failure count with respect to the feeding count exceeds a first frequency threshold value.

In addition, the state determination portion 8*f* may determine that the separation part is in a deteriorated state when the frequency of the separation failure count relative to the positional deviation count exceeds a second frequency threshold.

Moreover, the state determination portion 8*f* may determine that the feeding parts are in a deteriorated state when a representative value of the actual values of the positional deviation excess amount exceeds an excess amount threshold value. For example, the representative value of the actual values of the positional deviation excess amount is the maximum value or average value of the actual values of the positional deviation excess amount.

In addition, a plurality of individual separation failure count threshold values may be set in advance, each corresponding to the plurality of individual separation failure counts. In this case, the state determination portion 8*f* determines that the separation part deterioration state has occurred in a case in which each of the plurality of individual separation failure counts exceeds each of the plurality of individual separation failure count threshold values.

In a case in which it is determined that the degree of deterioration of the separation part is outside the allowable range, the state determination portion 8*f* shifts the process to step S308. On the other hand, in a case in which it is determined that the degree of deterioration of the separated part is not outside the allowable range, the state determination portion 8*f* ends the part deterioration determination process.

<Step S308>

In step S308, the state determination portion 8*f* outputs a separation part deterioration alarm via one or both of the display device 802 and the communication device 85. The separation part deterioration alarm is an alarm that prompts maintenance or replacement of the separation part.

For example, the state determination portion 8*f* causes the display device 802 to display information on the separation part deterioration alarm. In addition, the state determination portion 8*f* may also transmit the information on the separation part deterioration alarm to a manager's terminal via the communication device 85.

By executing the processes of steps S108 to S111 and the process of step S301, it is possible to determine the delay state of the feeding of each sheet 9 without requiring any additional equipment. In addition, by executing the part deterioration determination process, it is possible to determine the deterioration state of the feeding parts and the separation part in the sheet feeding device 2.

As described above, the return mechanism 28 achieves a function of ensuring that the initial positions of the sheets 9 are not deviated. In addition, the sheet feeding device 2 achieves a function of obtaining the target measurement time Ta for the next target sheet 9*a* after creating a situation in which the target sheet 9*a* has not deviated from the initial reference position P1 by the first return control. As a result, the feeding state of each sheet 9 can be accurately determined.

Figure 8:
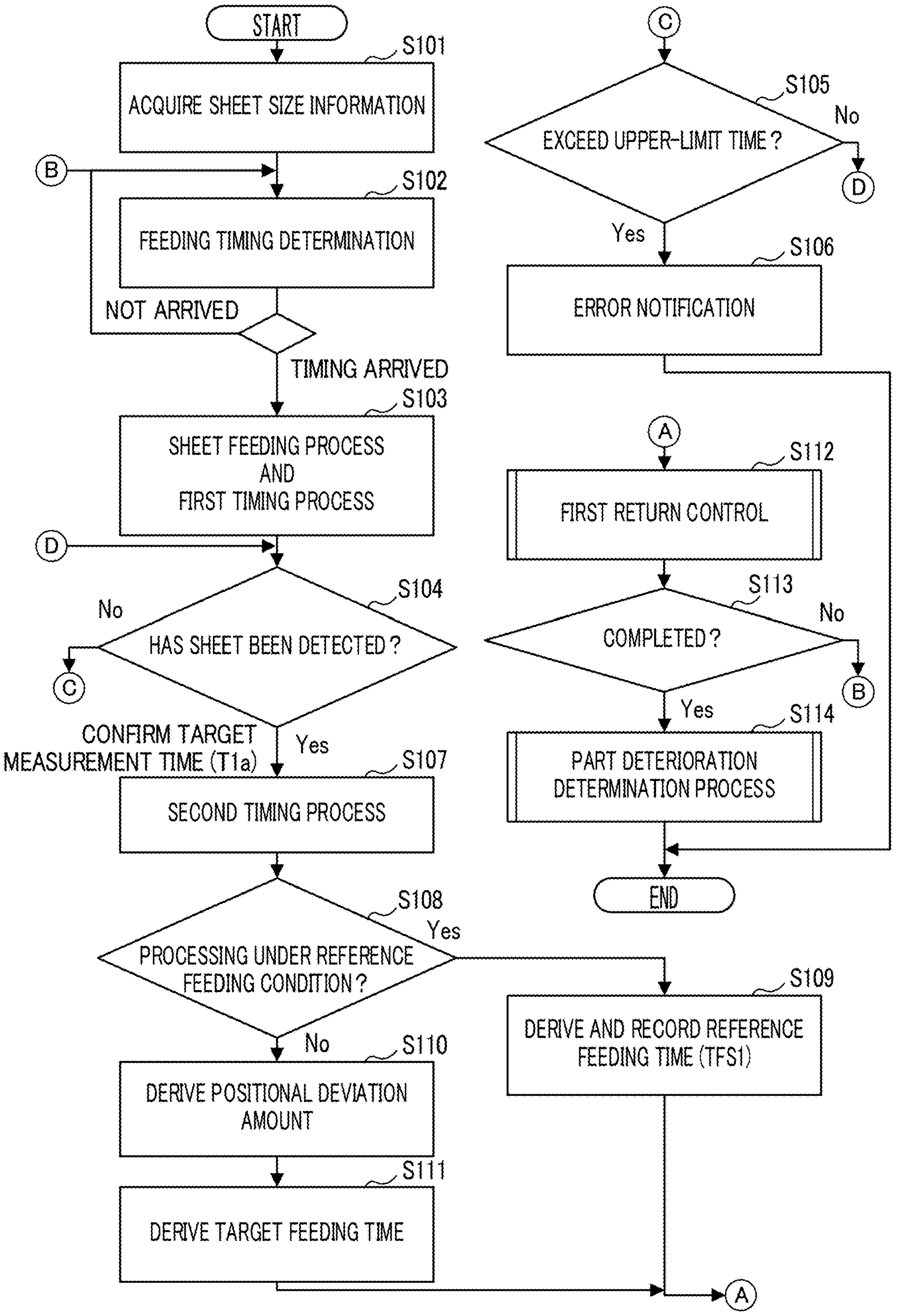
FIG. 8 is a flowchart showing an example of a procedure for sheet feeding control in an image forming apparatus according to an embodiment.

The first return control is executed while the sheet feeding control is being executed (see FIG. 8). On the other hand, the main processing portion 8*d* executes the second return control when the sheet feeding control is not being executed.

[Second Return Control]

Figure 11:
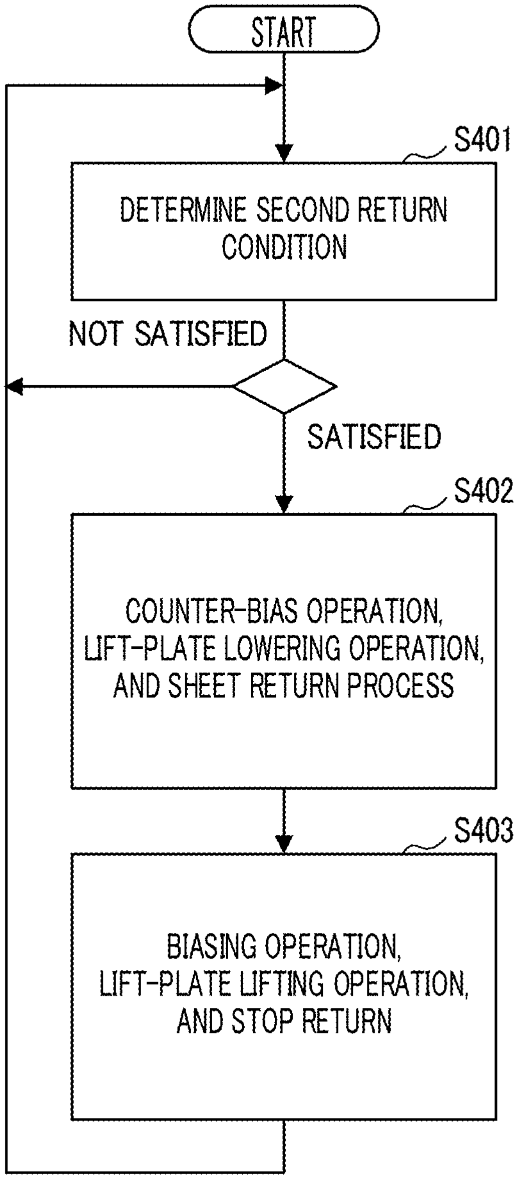
FIG. 11 is a flowchart showing an example of a procedure for a second return control in an image forming apparatus according to an embodiment.

In the following, an example of a procedure of the second return control will be described with reference to the flowchart shown in FIG. 11.

In the following description, S401 to S403 represent identification codes of three steps in the second return control. In the second return control, first, the process of step S401 is executed.

<Step S401>

In step S401, the main processing portion 8d determines whether or not a second return condition is met, and selects the next process depending on the determination result. The second return condition includes one or both of a feeding count condition and an instruction input condition.

The feeding count condition is a condition that the number of times the feeding process has been executed reaches a preset target number of times. For example, the main processing portion 8d determines whether or not the feeding count condition is satisfied when the image forming apparatus 10 is started and when the sheet feeding control is completed.

The instruction input condition is a condition that an instruction to execute the sheet return process is input. For example, an instruction to execute the sheet return process is input via the operation device 801 or the communication device 85.

In the present embodiment, the second return condition is a logical sum of the feeding count condition and the instruction input condition. Note that the second return condition may include a condition that the number of times the positional deviation amount exceeds the separation failure determination value exceeds a separation failure count threshold value. This condition is also an example of the positional deviation condition related to the positional deviation amount.

In a case in which the second return condition is met, the main processing portion 8d shifts the processing to step S402. On the other hand, in a case in which the second return condition is not met, the main processing portion 8d returns the processing to step S401.

<Step S402>

In step S402, the main processing portion 8d causes the bias adjustment mechanism 280 to execute the counter-bias operation, causes the lift mechanism 21 to execute the lift plate lowering operation, and further causes the return mechanism 28 to execute the sheet return process.

Figure 9:
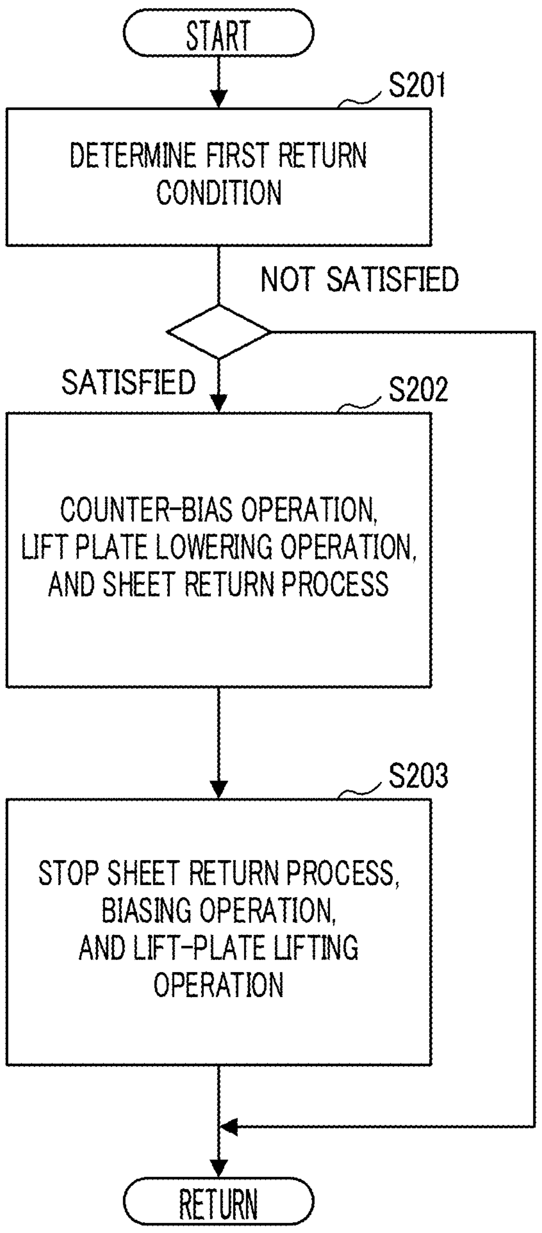
FIG. 9 is a flowchart showing an example of a procedure for a first return control in an image forming apparatus according to an embodiment.

The process of step S402 is the same as the process of step S202 (see FIG. 9).

By executing the process of step S402, the accompanying sheet that has reached the separation position P2 is returned to the initial reference position P1 or a position close to the initial reference position P1.

After executing the process of step S402, the main processing portion 8d executes the process of step S403.

<Step S403>

In step S403, the main processing portion 8d causes the return mechanism 28 to stop the sheet return process, causes the bias adjustment mechanism 280 to execute the biasing operation, and causes the lift mechanism 21 to execute the lift plate lifting operation.

The process of step S403 is the same as the process of step S203 (see FIG. 9).

After executing the process of step S403, the main processing portion 8d shifts the process to step S401.

By executing the second return control, the sheet feeding device 2 can measure the target measurement time T1a after creating a situation in which the initial position of the target sheet 9a is not deviated. As a result, the feeding state of each sheet 9 can be accurately determined.

First Modification

Figure 15:
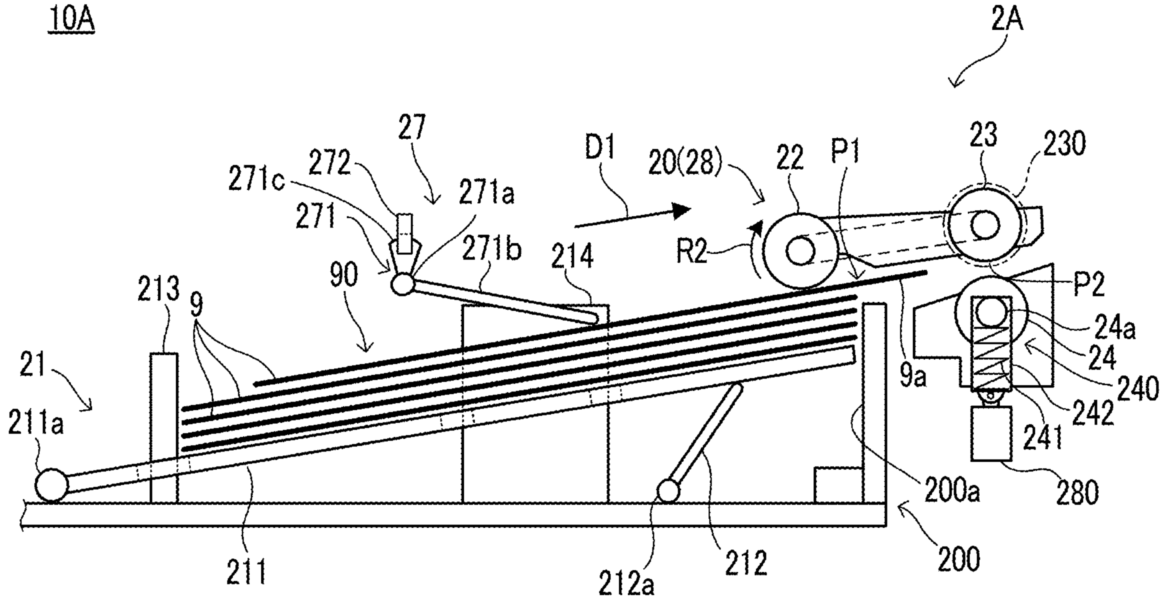
FIG. 15 is a configuration diagram of a sheet feeding device in an image forming apparatus according to a first modification.

Next, an image forming apparatus 10A according to a first modification will be described with reference to FIG. 15. The image forming apparatus 10A has a configuration in which the sheet feeding device 2 of the image forming apparatus 10 is replaced with a sheet feeding device 2A. The following describes the differences between the sheet feeding device 2A and the sheet feeding device 2.

The sheet feeding device 2A has a configuration in which the repelling member 281 and the drive mechanism 282 are removed from the sheet feeding device 2. In the sheet feeding device 2A, the feeding mechanism 20 also serves as the return mechanism 28.

The sheet return process by the feeding mechanism 20 is a process in which the pickup roller 22 and the feed-out roller 23 are rotated a predetermined amount in a direction opposite to the rotation direction when the feeding process is executed before the lift mechanism 21 switches from the contact state to the separation state.

The feeding mechanism 20 returns the positionally deviated sheet to the upstream side in the sheet feeding direction D1 by executing the sheet return process.

When the sheet return process is executed by the feeding mechanism 20, the main processing portion 8d causes the bias adjustment mechanism 280 to execute the counter-bias operation.

In a case in which the sheet feeding device 2A is employed, the main processing portion 8d executes the following processes in the first return control step S202 and the second return control step S402.

That is, the main processing portion 8d causes the bias adjustment mechanism 280 to execute the counter biasing operation, causes the feeding mechanism 20 to execute the sheet return process, and further causes the lift mechanism 21 to execute the lift plate lowering operation.

In a case in which the sheet feeding device 2A is employed, the main processing portion 8d executes the following processes in the first return control step S203 and the second return control step S403.

That is, the main processing portion 8d causes the feeding mechanism 20 to stop the sheet return process, causes the bias adjustment mechanism 280 to execute the biasing operation, and further causes the lift mechanism 21 to executed the lift plate lifting operation.

When the sheet feeding device 2A is employed, the same effects as when the sheet feeding device 2 is employed can be obtained.

Second Modification

Figure 16:
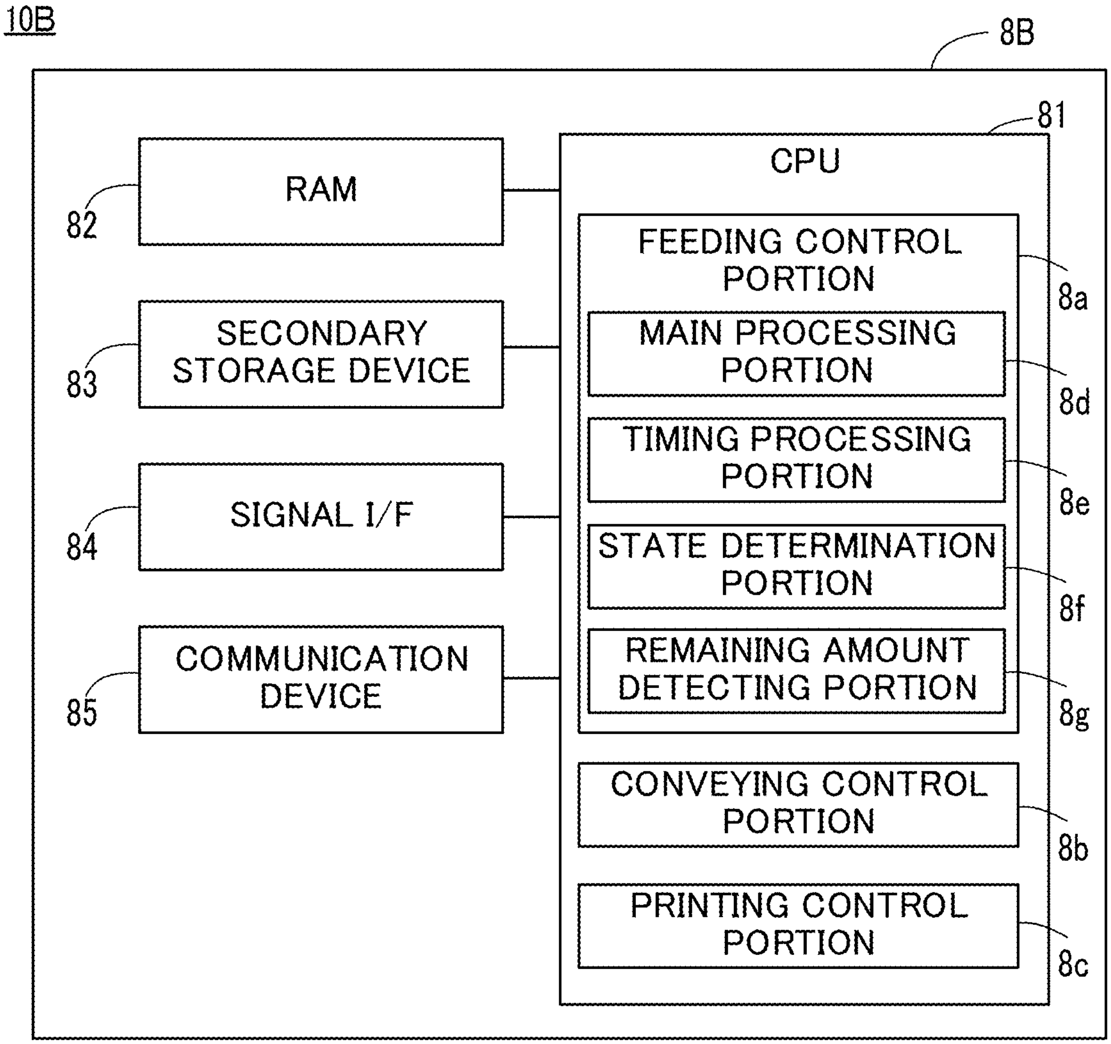
FIG. 16 is a block diagram showing a configuration of a control device in an image forming apparatus according to a second modification.

Next, an image forming apparatus 10B according to a second modification will be described with reference to FIG. 16. The image forming apparatus 10B has a configuration in which the control device 8 of the image forming apparatus 10 is replaced with a control device 8B. The following describes the differences between the control device 8B and the control device 8.

The control device 8B has a configuration in which a remaining amount detecting portion 8g is added to the feeding control portion 8a of the control device 8. That is, the feeding control portion 8a, which is one of the plurality of processing modules, includes a remaining amount detecting portion 8g.

The remaining amount detecting portion 8g detects the remaining amount of sheets. The CPU 81 including the remaining amount detecting portion 8g is an example of a remaining amount detecting device.

For example, the remaining amount detecting portion 8g measures an initial lifting time from when the lift mechanism 21 starts the lift plate lifting operation from a state where the lift plate 211 is at a lower end position until the lift plate switches to the contact state.

Furthermore, the remaining amount detecting portion 8*g* derives an initial remaining amount of sheets by applying the initial lifting time to a predetermined conversion formula. The initial remaining amount of sheets increases as the initial lifting time decreases.

Furthermore, the remaining amount detecting portion 8*g* derives the remaining amount of sheets by subtracting a unit amount from the initial remaining amount of sheets every time the feeding process is executed.

Note that the sheet feeding device 2 may include a rotary encoder that detects a rotation angle of the rotation shaft 211*a* of the lift plate 211 or the rotation shaft 212*a* of the push-up plate 212. In this case, the angle detected by the rotary encoder when the lift mechanism 21 maintains the contact state represents the remaining amount of sheets. The rotary encoder is an example of a remaining amount detecting device.

In this modification, one or both of the first return condition in the first return control and the second return condition in the second return control include a sheet remaining amount condition shown below.

The sheet remaining amount condition is a condition that the remaining amount of sheets detected by the remaining amount detecting portion 8*g* falls into one of a plurality of preset remaining amount categories.

In the sheet feeding device 2, the sheet feeding characteristics may differ depending on the remaining amount of sheets. Differences in the characteristics of sheet feeding affect the reference feeding time TFS1.

As described above, in the first return control or the second return control, each time the first return condition or the second return condition is met, the main processing portion 8*d* causes the return mechanism 28 to execute the sheet return process (see steps S201 to S202 or steps S401 to S402).

That is, in the first return control or the second return control in the present modification, the main processing portion 8*d* causes the return mechanism 28 to execute the sheet return process every time the sheet remaining amount condition is met.

Furthermore, every time the sheet return process is executed, the reference feeding condition is met in step S108 of the sheet feeding control, and the reference feeding time TFS1 is set in step S109.

Therefore, by adopting the sheet remaining amount condition, an appropriate reference feeding time TFS1 is set according to each of the plurality of remaining amount categories.

Third Modification

Next, the sheet feeding device 2 in the image forming apparatus according to a third modification will be described.

In the present modification, the feeding mechanism 20 further includes a pickup roller displacement mechanism. The pickup roller displacement mechanism moves the pickup roller 22 between an operating position where the pickup roller 22 contacts an upper surface of the topmost sheet of the stack of sheets 90 and a retreat position where the pickup roller 22 is spaced upward from the topmost sheet.

The pickup roller displacement mechanism is an example of a displacement mechanism that causes the pickup roller 22 to displace. The pickup roller displacement mechanism can switch between a contact state in which the stack of sheets 90 and the pickup roller 22 are in contact with each other and a separation state in which the stack of sheets 90 and the pickup roller 22 are separated by displacing the pickup roller 22.

In the following description, operation of the pickup roller displacement mechanism to move the pickup roller 22 from the operating position to the retreat position will be referred to as a retreat operation. Similarly, operation of the pickup roller displacement mechanism to move the pickup roller 22 from the retreat position to the operating position is referred to as a feeding preparation operation.

In step S202 of the first return control and step S402 of the second return control in the present modification, the main processing portion 8*d* executes the following first alternative process instead of causing the lift mechanism 21 to execute the lift plate lowering operation.

The first alternative process is a process of causing the pickup roller displacement mechanism to execute the retreat operation.

In step S203 of the first return control and step S403 of the second return control in the present modification, the main processing portion 8*d* executes the following second alternative process instead of causing the lift mechanism 21 to execute the lift plate lifting operation.

The second alternative process is a process of causing the pickup roller displacement mechanism to execute the feeding preparation operation.

In a case in which the present modification is adopted, the same effects as when the sheet feeding device 2 or the sheet feeding device 2A is adopted can be obtained.

Fourth Modification

Next, the sheet feeding device 2 in the image forming apparatus according to a fourth modification will be described.

As described above, in the second return control, the sheet return process is executed every time the feeding count condition is met (see steps S401 and S402).

Furthermore, every time the sheet return process is executed, the reference feeding condition is met in step S108 of the sheet feeding control, and the reference feeding time TFS1 is set in step S109.

In the present modification, the state determination portion 8*f* derives a reference delay time that indicates the degree of delay in the reference feeding process every time the reference feeding time TFS1 is set in step S109. The reference delay time indicates a degree of delay in the reference feeding process.

The state determination portion 8*f* derives the reference delay time based on the reference feeding time TFS1 and a preset delay determination time TDS1.

More specifically, when the reference feeding time TFS1 exceeds the delay determination time TDS1, the state determination portion 8*f* derives the difference between the reference feeding time TFS1 and the delay determination time TDS1 as the reference delay time.

On the other hand, the state determination portion 8*f* sets the reference delay time to 0 when the reference feeding time TFS1 does not exceed the delay determination time TDS1.

Furthermore, in step S109, the main processing portion 8*d* changes the target count for the feeding count condition based on one or both of the magnitude of the reference delay time and the change in the reference delay time.

For example, the main processing portion 8*d* executes one or both of a first target count change process and a second target count change process.

The first target count change process is a process of changing the target count to a smaller number when the reference delay time exceeds a delay threshold value or when the number of times the reference delay time exceeds the delay threshold value exceeds a specific count.

The second target count change process is a process of changing the target count to a smaller number when the amount of change in the reference delay time exceeds a change amount threshold value.

The delay threshold value, the specific count, and the change amount threshold value are each set in advance.

A situation in which the reference delay time exceeds the delay threshold value and a situation in which the change in the reference delay time exceeds the change amount threshold value are situations in which the reference feed time TFS1 is likely to change at a rapid pace due to the progression of deterioration of the pickup roller 22 or the feed-out roller 23.

In a case in which the present modification is adopted, the sheet return process and the setting of the reference feeding time TFS1 are executed relatively frequently in a situation where the reference feeding time TFS1 is likely to change at a fast pace. Thus, an appropriate reference feeding time TFS1 can be quickly set according to the deterioration state of the pickup roller 22 and the feed-out roller 23.

Note that the main processing portion 8*d* may set the target count to be smaller as the total cumulative count of the feeding process is larger.

SUPPLEMENTARY NOTES

An outline of the technique according to the disclosure extracted from the above-described embodiments will be added below. Note that the configurations and processing functions described in the following supplementary notes can be selected and combined as desired.

Supplementary Note 1

A sheet feeding device, including:

a feeding mechanism including a feeding rotating body configured to contact an upper surface of a topmost sheet of a stack of sheets, a feed-out rotating body that is spaced apart from the feeding rotating body, and a separating member that is positioned below the feed-out rotating body and biased toward the feed-out rotating body, the feeding mechanism rotating the feeding rotating body and the feed-out rotating body to execute a feeding process of feeding sheets from the stack of sheets to a conveying path, and separating accompanying sheets that are fed out accompanying each sheet from each sheet by the separating member;

a displacement mechanism configured to be able to switch between a contact state in which the stack of sheets contacts the feeding rotating body and a separation state in which the stack of sheets is separated from the feeding rotating body by displacing the stack of sheets or the feeding rotating body; and a sheet detecting device configured to detect each sheet at a position on a downstream side of the feed-out rotating body and the separating member in a sheet feeding direction;

a timing device that measures an elapsed time from a time when the feeding process for each sheet is started to a time when each sheet is detected by the sheet detecting device;

a return mechanism configured to execute a sheet return process to return, when the displacement mechanism switches from the contact state to the separation state, a positionally deviated sheet among the stack of sheets that has been positionally deviated to a downstream side in the sheet feeding direction with respect to an initial reference position to an upstream side in the sheet feeding direction;

a processing device configured to derive a positional deviation amount representing a deviation amount of a position of a target sheet relative to the initial reference position at a time when the feeding process for the target sheet is started, based on a preset reference feeding time and a target measurement time measured by the timing device for the target sheet fed by the feeding process; and a control device that causes the return mechanism to execute the sheet return process when the positional deviation amount satisfies a predetermined positional deviation condition.

Supplementary Note 2

The sheet feeding device according to Supplementary Note 1, including a sheet-out detecting device configured to detect a sheet-out state when there are no sheets remaining that can be fed by the feeding mechanism; wherein the control device causes the return mechanism to execute the sheet return process when the positional deviation amount satisfies the positional deviation condition and the sheet-out state is not detected by the sheet-out detecting device.

Supplementary Note 3

The sheet feeding device according to Supplementary Note 2, wherein the positional deviation condition includes a condition that the positional deviation amount exceeds a separation failure determination value corresponding to a path length from the initial reference position to a position of the separating member.

Supplementary Note 4

The sheet feeding device according to any one of Supplementary Notes 1 to 3, wherein the processing device sets the reference feeding time based on one or more reference measurement times measured by the timing device when one or more reference feeding processes are executed that satisfy the reference feeding condition that the feeding process is one or more times executed a predetermined number of times after the displacement mechanism first switches from the separation state to the contact state after the sheet return process is executed.

Supplementary Note 5

The sheet feeding device according to Supplementary Note 4, including a remaining amount detecting device configured to detect a remaining amount of sheets; wherein the control device causes the return mechanism to execute the sheet return process every time the detected remaining amount of sheets falls into one of a plurality of preset remaining amount categories.

Supplementary Note 6

The sheet feeding device according to Supplementary Note 4 or Supplementary Note 5, wherein the control device causes the return mechanism to execute the sheet return process each time the number of times the feeding process has been executed reaches a preset target count.

Supplementary Note 7

The sheet feeding device according to Supplementary Note 6, wherein the processing device derives a reference delay time representing a degree of delay in the reference feeding process based on the reference feeding time and a preset delay determination time each time the reference feeding time is set; and the control device changes the target count based on one or both of a magnitude of the reference delay time and a change in the reference delay time.

Supplementary Note 8

The sheet feeding device according to any one of Supplementary Notes 1 to 7, wherein the return mechanism includes a bias adjustment mechanism configured to reduce a bias of the separating member toward the feed-out rotating body or releases a bias of the separating member toward the feed-out rotating body when the sheet return process is executed.

Supplementary Note 9

The sheet feeding device according to any one of Supplementary Notes 1 to 8, wherein the return mechanism has a repelling member supported rotatably around a shaft portion arranged above or below a pre-separation path from the initial reference position to a position of the separating member, and a drive mechanism configured to rotate the repelling member; and the repelling member, by repelling the positionally deviated sheet toward the upstream side in the sheet feeding direction, returns the positionally deviated sheet to the upstream side in the sheet feeding direction.

Supplementary Note 10

The sheet feeding device according to any one of Supplementary Notes 1 to 8, wherein the feeding mechanism also serves as the return mechanism, and the feeding mechanism, before the displacement mechanism switches from the contact state to the separation state, returns the positionally deviated sheet to the upstream side in the sheet feeding direction by rotating the feeding rotating body by a predetermined rotation amount in a direction opposite to the rotation direction when the feeding process is executed.

Supplementary Note 11

The sheet feeding device according to any one of Supplementary Notes 1 to 10, wherein the displacement mechanism is a lift mechanism that switches between the contact state and the separation state by lifting and lowering the stack of sheets.

Supplementary Note 12

An image forming apparatus, including:

the sheet feeding device according to any one of Supplementary Notes 1 to 11, and a printing device configured to form an image on each sheet fed by the sheet feeding device.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A sheet feeding device comprising:

a feeding mechanism including a feeding rotating body configured to contact an upper surface of a topmost sheet of a stack of sheets, a feed-out rotating body that is spaced apart from the feeding rotating body, and a separating member that is positioned below the feed-out rotating body and biased toward the feed-out rotating body, the feeding mechanism rotating the feeding rotating body and the feed-out rotating body to execute a feeding process of feeding sheets from the stack of sheets to a conveying path, and separating accompanying sheets that are fed out accompanying each sheet from each sheet by the separating member;

a displacement mechanism configured to be able to switch between a contact state in which the stack of sheets contacts the feeding rotating body and a separation state in which the stack of sheets is separated from the feeding rotating body by displacing the stack of sheets or the feeding rotating body; and a sheet detecting device configured to detect each sheet at a position on a downstream side of the feed-out rotating body and the separating member in a sheet feeding direction;

a timing device configured to measure an elapsed time from a time when the feeding process for each sheet is started to a time when each sheet is detected by the sheet detecting device;

a return mechanism configured to execute a sheet return process to return, when the displacement mechanism switches from the contact state to the separation state, a positionally deviated sheet among the stack of sheets that has been positionally deviated to a downstream side in the sheet feeding direction with respect to an initial reference position to an upstream side in the sheet feeding direction;

a processing device configured to derive a positional deviation amount representing a deviation amount of a position of a target sheet relative to the initial reference position at a time when the feeding process for the target sheet is started, based on a preset reference feeding time and a target measurement time measured by the timing device for the target sheet fed by the feeding process; and a control device that causes the return mechanism to execute the sheet return process when the positional deviation amount satisfies a predetermined positional deviation condition.

2. The sheet feeding device according to claim 1, comprising a sheet-out detecting device configured to detect a sheet-out state when there are no sheets remaining that can be fed by the feeding mechanism; wherein the control device causes the return mechanism to execute the sheet return process when the positional deviation amount satisfies the positional deviation condition and the sheet-out state is not detected by the sheet-out detecting device.

3. The sheet feeding device according to claim 2, wherein the positional deviation condition includes a condition that the positional deviation amount exceeds a separation failure determination value corresponding to a path length from the initial reference position to a position of the separating member.

4. The sheet feeding device according to claim 1, wherein the processing device sets the reference feeding time based on one or more reference measurement times measured by the timing device when one or more reference feeding processes are executed that satisfy the reference feeding condition that the feeding process is one or more times executed a predetermined number of times after the displacement mechanism first switches from the separation state to the contact state after the sheet return process is executed.

5. The sheet feeding device according to claim 4, comprising a remaining amount detecting device configured to detect a remaining amount of sheets; wherein the control device causes the return mechanism to execute the sheet return process every time the detected remaining amount of sheets falls into one of a plurality of preset remaining amount categories.

6. The sheet feeding device according to claim 4, wherein the control device causes the return mechanism to execute the sheet return process each time the number of times the feeding process has been executed reaches a preset target count.

7. The sheet feeding device according to claim 6, wherein the processing device derives a reference delay time representing a degree of delay in the reference feeding process based on the reference feeding time and a preset delay determination time each time the reference feeding time is set; and the control device changes the target count based on one or both of a magnitude of the reference delay time and a change in the reference delay time.

8. The sheet feeding device according to claim 1, wherein the return mechanism includes a bias adjustment mechanism configured to reduce a bias of the separating member toward the feed-out rotating body or releases a bias of the separating member toward the feed-out rotating body when the sheet return process is executed.

9. The sheet feeding device according to claim 1, wherein the return mechanism has a repelling member supported rotatably around a shaft portion arranged above or below a pre-separation path from the initial reference position to a position of the separating member, and a drive mechanism configured to rotate the repelling member; and the repelling member, by repelling the positionally deviated sheet toward the upstream side in the sheet feeding direction, returns the positionally deviated sheet to the upstream side in the sheet feeding direction.

10. The sheet feeding device according to claim 1, wherein the feeding mechanism also serves as the return mechanism, and the feeding mechanism, before the displacement mechanism switches from the contact state to the separation state, returns the positionally deviated sheet to the upstream side in the sheet feeding direction by rotating the feeding rotating body by a predetermined rotation amount in a direction opposite to the rotation direction when the feeding process is executed.

11. The sheet feeding device according to claim 1, wherein the displacement mechanism is a lift mechanism that switches between the contact state and the separation state by lifting and lowering the stack of sheets.

12. An image forming apparatus, comprising:

the sheet feeding device according to claim 1, and a printing device configured to form an image on each sheet fed by the sheet feeding device.

* * * * *